United States Patent
Hayashi et al.

(10) Patent No.: US 9,551,604 B2
(45) Date of Patent: Jan. 24, 2017

(54) MULTIPHASE FLOWMETER

(71) Applicant: YOKOGAWA ELECTRIC CORPORATION, Musashino-shi, Tokyo (JP)

(72) Inventors: Yuichi Hayashi, Tokyo (JP); Satoshi Fukuhara, Tokyo (JP); Rai Itou, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 37 days.

(21) Appl. No.: 14/629,675

(22) Filed: Feb. 24, 2015

(65) Prior Publication Data

US 2015/0247748 A1 Sep. 3, 2015

(30) Foreign Application Priority Data

Feb. 28, 2014 (JP) .................................. 2014-038733
Aug. 13, 2014 (JP) .................................. 2014-164930

(51) Int. Cl.
 G01F 1/74 (2006.01)
 G01F 1/708 (2006.01)

(52) U.S. Cl.
 CPC ............... *G01F 1/74* (2013.01); *G01F 1/7082* (2013.01)

(58) Field of Classification Search
 CPC ................ G01F 1/74; G01F 1/66; G01F 1/32; G01F 1/20; G01F 13/00; G01F 1/34; G01F 1/00; G01G 19/00; G01G 19/40; G01G 19/22

(Continued)

(56) References Cited

U.S. PATENT DOCUMENTS

| | | | | | |
|---|---|---|---|---|---|
| 4,336,719 | A | * | 6/1982 | Lynnworth | ............. G01F 1/667 73/861.27 |
| 4,472,960 | A | * | 9/1984 | Motoyama | ............. G01N 33/15 33/501 |

(Continued)

FOREIGN PATENT DOCUMENTS

EP 1211488 A2 6/2002
JP 08-271309 A 10/1996

(Continued)

OTHER PUBLICATIONS

"Portabel, schnell und zuverlassig. FLUXUS F/G601 und F/G608: Mobile Durchflussmessung von Flussigkeiten und Gasen im eingriffsfreien Clamp-On-Verfahren", Oct. 2013, (13 Pages total) XP055205122.

*Primary Examiner* — Jewel V Thompson
(74) *Attorney, Agent, or Firm* — Sughrue Mion, PLLC

(57) ABSTRACT

A multiphase flowmeter includes a first flow quantity measurer configured to transmit and receive a first measurement signal, the first flow quantity measurer being disposed on an outside wall of a vertical pipe line, a second flow quantity measurer configured to transmit and receive a second measurement signal, the second flow quantity measurer being disposed on an outside wall of a horizontal pipe line which is connected to the vertical pipeline, and a flow quantity parameter calculator configured to receive the first measurement signal from the first flow quantity measurer and the second measurement signal from the second flow quantity measurer, the flow quantity parameter calculating a flow quantity parameter in accordance with the first measurement signal and the second measurement signal.

17 Claims, 22 Drawing Sheets

(58) Field of Classification Search
USPC .............. 73/861.04, 861.21, 861.24, 861.27, 73/861.41, 861.744, 861.28; 360/611; 177/25.3, 1.06, 19.03; 702/47
See application file for complete search history.

(56) References Cited

U.S. PATENT DOCUMENTS

| | | | | |
|---|---|---|---|---|
| 5,245,318 A * | 9/1993 | Tohge | ................ | G01N 15/1404 324/71.4 |
| 5,576,499 A * | 11/1996 | Davies | ..................... | G01F 1/30 73/433 |
| 5,660,909 A * | 8/1997 | Tachibana | ............ | G01N 29/032 181/139 |
| 6,629,449 B1 * | 10/2003 | Kline-Schoder | ......... | A61B 8/08 356/243.2 |
| 6,732,565 B1 * | 5/2004 | Jach | .................. | G01N 27/4175 73/1.06 |
| 6,799,475 B2 * | 10/2004 | van Klooster | ......... | G01F 1/662 73/861.24 |
| 7,334,780 B2 * | 2/2008 | Sakakibara | ............... | A23L 2/54 261/104 |
| 7,578,203 B2 * | 8/2009 | Andersen | ............. | G01N 29/046 73/61.75 |
| 7,906,737 B2 * | 3/2011 | Freydank | ............. | G01G 23/002 177/210 EM |
| 7,964,806 B2 * | 6/2011 | Freydank | ............... | G01G 23/10 177/185 |
| 8,176,796 B2 * | 5/2012 | Hurmuzlu | ................ | G01F 1/74 73/861.44 |
| 8,489,341 B2 * | 7/2013 | Brown | .................. | A61M 5/365 128/DIG. 12 |
| 8,978,481 B2 * | 3/2015 | Powell | ...................... | G01F 1/74 73/861.23 |
| 2012/0055239 A1 | 3/2012 | Sinha | | |
| 2013/0345996 A1 | 12/2013 | Satoh et al. | | |
| 2014/0290382 A1 * | 10/2014 | Drobkov | ............ | G01F 1/662 73/861.28 |

FOREIGN PATENT DOCUMENTS

| | | |
|---|---|---|
| JP | 10-281843 A | 10/1998 |
| WO | 2008/147408 A1 | 12/2008 |

\* cited by examiner

*FIG. 7A*  *FIG. 7B*
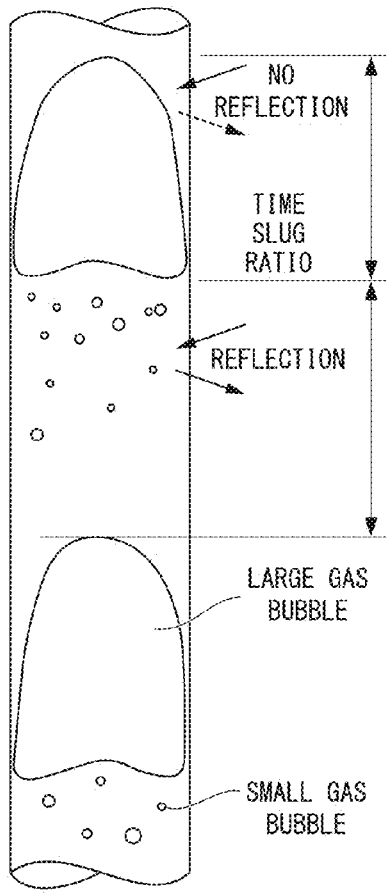
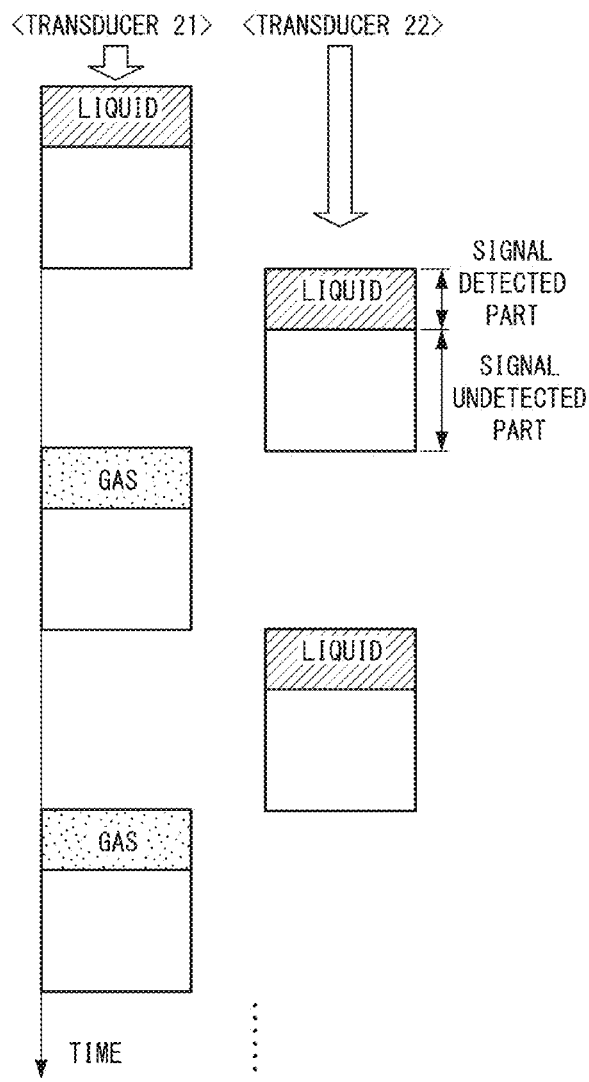

<GAS BUBBLE QUANTITY 40%>

<GAS BUBBLE QUANTITY 20%>

MULTIPHASE FLOWMETER

BACKGROUND OF THE INVENTION

1. Field of the Invention

The disclosure relates to a multiphase flowmeter which can measure a flow quantity of multiphase fluid.

Priorities are claimed on Japanese Patent Application No. 2014-038733, filed Feb. 28, 2014, and Japanese Patent Application No. 2014-164930, filed Aug. 13, 2014, the contents of which are incorporated herein by reference.

2. Description of Related Art

In a case where a multiphase fluid in which water, oil, and gas are mixed flows in a pipe line, a multiphase flowmeter can measure a flow quantity of each fluid mixed in the multiphase fluid. Recently, various types of multiphase flowmeters are developed.

In Japanese Unexamined Patent Application Publication No. H08-271309, two multiphase density meters are described. Specifically, the two multiphase density meters are disposed on a horizontal pipe line along a flow direction of the multiphase fluid, and ratio of each fluid is calculated based on relative permittivity of the multiphase fluid. Time required for fluid to flow between the two multiphase density meters is calculated, and the flow quantity of the multiphase fluid is measured based on a correlation method.

In Japanese Unexamined Patent Application Publication No. H10-281843, a multiphase flowmeter is described. Specifically, the multiphase flowmeter is equipped with an electromagnetic flowmeter, a component ratio sensor, and a calculation circuit. The electromagnetic flowmeter and the component ratio sensor are disposed on a pipe line along a flow direction of the multiphase fluid. The calculation circuit calculates a flow quantity of each fluid mixed in the multiphase fluid based on measurement signals transmitted from the electromagnetic flowmeter and the component ratio sensor.

However, because the detection devices are combined in the multiphase flowmeter, the configuration of the entire multiphase flowmeter is complicated, and costs of the device are increased.

SUMMARY

A multiphase flowmeter may include a first flow quantity measurer configured to transmit and receive a first measurement signal, the first flow quantity measurer being disposed on an outside wall of a vertical pipe line, a second flow quantity measurer configured to transmit and receive a second measurement signal, the second flow quantity measurer being disposed on an outside wall of a horizontal pipe line which is connected to the vertical pipeline, and a flow quantity parameter calculator configured to receive the first measurement signal from the first flow quantity measurer and the second measurement signal from the second flow quantity measurer, the flow quantity parameter calculating a flow quantity parameter in accordance with the first measurement signal and the second measurement signal.

Further features and aspects of the present disclosure will become apparent from the following detailed description of exemplary embodiments with reference to the attached drawings.

BRIEF DESCRIPTION OF THE DRAWINGS

FIG. 7A is a magnified view of the pipe line in which the slug flow exists.

FIG. 7B is a conceptual diagram of signal detection by the transducers 21 and 22 in the slug flow shown in FIG. 4.

DETAILED DESCRIPTION OF THE EMBODIMENTS

An aspect of some embodiments of the present invention is to provide a multiphase flowmeter which can measure a flow quantity of liquid, gas, and solid particles which are mixed in the multiphase fluid easily at low cost.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Embodiment

Figure 1:
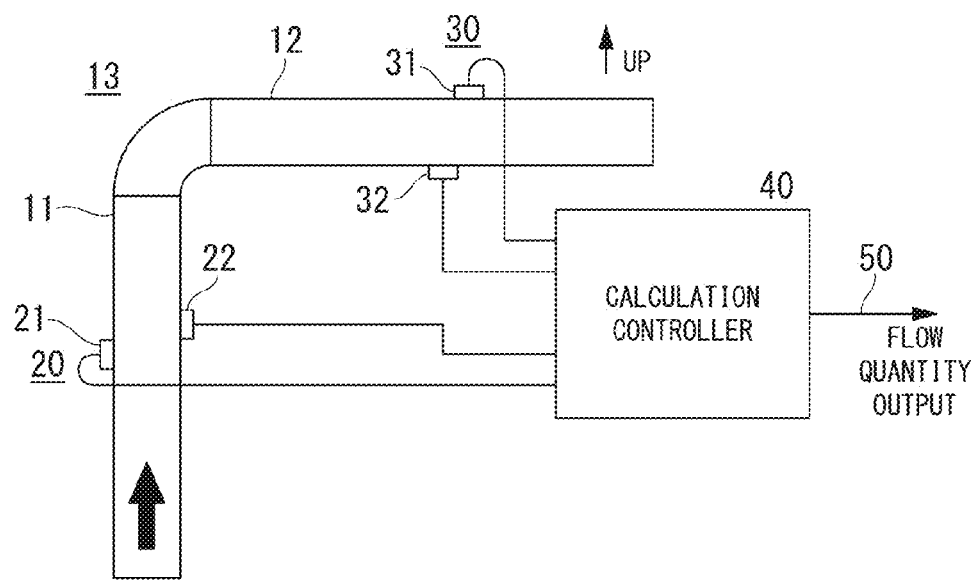
FIG. 1 is a drawing illustrating a multiphase flowmeter in a first embodiment.

FIG. 1 is a drawing illustrating a multiphase flowmeter in a first embodiment. In FIG. 1, a pipe line 13 is equipped with a vertical pipe line 11 and a horizontal pipe line 12. Fluid flows upwardly in the vertical pipe line 11, and the fluid flows horizontally in the horizontal pipe line 12.

A first flow quantity measurer 20 is equipped with transducers 21 and 22. The transducers 21 and 22 are disposed on an outside wall of the vertical pipe line 11 so as to sandwich the vertical pipe line 11 in the horizontal direction. The transducers 21 and 22 transmit and receive measurement signals. At least one of the transducers 21 and 22 may be disposed on the vertical pipe line 11. A flow velocity of the fluid can be calculated based on reflection signals from gas bubbles in the fluid by means of a method such as a reflection correlation method or Doppler method. However, a transit time method is unsuitable for measuring flow velocity of the gas bubble.

A second flow quantity measurer 30 is equipped with transducers 31 and 32. The transducers 31 and 32 are disposed on the outside wall of the horizontal pipe line 12 so as to sandwich the horizontal pipe line 12 in the vertical direction. Same as the transducers 21 and 22, at least one of the transducers 31 and 32 may be disposed on the horizontal pipe line 12. The flow velocity of the fluid can be calculated by means of a method such as the reflection correlation method or Doppler method. Also, the flow velocity of the fluid in the horizontal pipe line 12 can be calculated by the use of the transducers 31 and 32 by means of the transit time method.

The transducers 21 and 22 included in the first flow quantity measurer 20 and the transducers 31 and 32 included in the second flow quantity measurer 30 are connected to a calculation controller 40. The calculation controller 40 functions as a flow quantity parameter calculator.

The calculation controller 40 drives and controls the transducers 21, 22, 31 and 32 so as to calculate and accumulate measurement data. The calculation controller 40 displays and outputs the calculation result. The calculation controller 40 is connected to outside via a cable 50 for the purpose of being supplied electrical power from the outside, outputting signals of 4-20 [mA] to the outside, and communicating with the outside.

Figure 2:
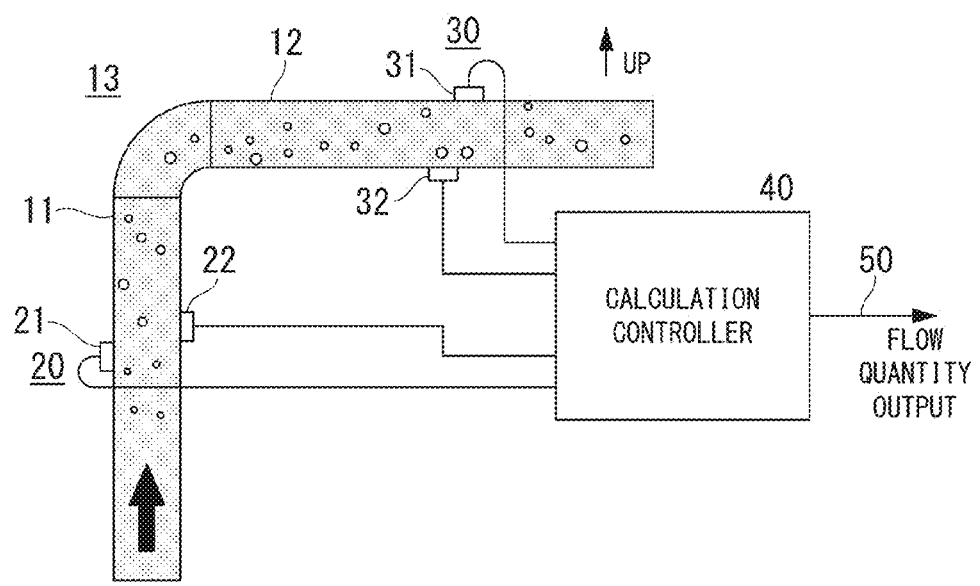
FIG. 2 is a drawing illustrating a state in which the gas bubbles flow in the pipe line.

FIG. 2 is a drawing illustrating a state in which the gas bubbles flow in the pipe line. In FIG. 2, because the transducers 31 and 32 included in the second flow quantity measurer 30 are disposed so as to sandwich the horizontal pipe line 12 in the vertical direction, in a case where the amount of the gas in the pipe line is very little, the pipe line is almost full of the fluid. For the reason, the transducers 31 and 32 can detect the reflection signals.

In the state, the gas amount in the pipe line is within several percent, and small gas bubbles flow in the pipe line, which is called "gas bubble flow". A signal processing of "gas bubble flow mode" is performed so as to calculate the quantity of the gas bubbles.

In a case where the quantity of the gas bubbles is increased, the gas gathers around the upside in the horizontal pipe line 12, and the pipe line is not full of the fluid. Because impedances of the pipe line and the gas are different extremely, ultrasonic wave cannot be propagated in the pipe line, and the transducer 31 disposed above the horizontal pipe line 12 cannot detect the signal. However, because the transducer 32 is disposed below the horizontal pipe line 12, even if the pipe line is not full of the fluid, the transducer 32 can detect the signal.

In the state, the gas amount in the pipe line is more than several percent and less than one hundred percent. In this case, large gas bubbles and the small gas bubbles flow alternately in the vertical pipe line 11. A diameter of the large gas bubble is similar in size to a diameter of the pipe line, and the flow of the large gas bubbles is called "slug flow". A signal processing of "slug flow mode" is performed so as to calculate the quantity of the gas bubbles in the situation. Details of "slug flow mode" will be described later.

In a case where the quantity of the gas bubbles is further increased and the horizontal pipe line 12 is almost full of the gas, the transducer 32 disposed below the horizontal pipe line 12 cannot detect the signal. In this case, because the gas amount in the horizontal pipe line 12 is almost one hundred percent, the calculation controller 40 determines that a quantity of the gas flow is one hundred percent.

Because it cannot be happened that the transducer 31 can detect the signal and the transducer 32 cannot detect the signal, in this case, the calculation controller 40 determines that "sensor failure" is happened.

By means of the reflection correlation method, a position of interface between gas and liquid can be identified by the use of the transducers 31 and 32 which are disposed so as to sandwich the horizontal pipe line 12 in the vertical direction. The identified position is a rough indication of a ratio of gas and liquid.

However, because a slip exists between gas and liquid, the gas and the liquid does not flow in the pipe line at same velocity. Also, because gas has compaction property and conforms to Boyle-Charle's law, depending on a state of the pipe line downstream of the measurement position (for example, whether opened to the atmosphere or pressured), correctly-calculating a volume of the gas and a flow quantity of the gas is difficult by only the transducers 31 and 32.

The gas bubble flow mode will be described below. The calculation controller 40 calculates the flow velocity by the use of the transducers 21 and 22 by means of the reflection correlation method or Doppler method. Because the transducers 21 and 22 are disposed on the vertical pipe line 11, the calculation controller 40 calculates the flow velocity by calculating the velocity of the fluid+buoyancy force of the gas bubble (or −gravity of particle). In FIG. 2, because the fluid flows upwardly, the flow velocity of the gas bubble is faster than the flow velocity of the liquid by the buoyancy force of the gas bubble.

On the other hand, because the transducers 31 and 32 are disposed on the horizontal pipe line 12, the flow velocity measured by using the transducers 31 and 32 is not affected by the buoyancy force of the gas bubble, and the flow velocity of only the fluid is measured.

The calculation controller 40 calculates the flow velocity in accordance with signals transmitted from the transducers 21, 22, 31 and 32. Also, the calculation controller 40 calculates a flow velocity difference of the flow velocity measured by using the transducers 21 and 22 with respect to the flow velocity measured by using the transducers 31 and 32.

In a case where the flow velocity measured by using the transducers 21 and 22 has a plus difference with respect to the flow velocity measured by using the transducers 31 and 32 and the difference is more than a predetermined threshold, the calculation controller 40 determines "gas bubble exists" and performs a gas bubble diameter measurement routine. The calculation controller 40 may determine it in accordance with elapsed time of the plus difference or data number of the plus difference.

In the gas bubble diameter measurement routine, assuming that the flow velocity difference of the flow velocity observed by using the transducers 21 and 22 with respect to the flow velocity observed by using the transducers 31 and 32 is corresponds to the buoyancy force, the calculation controller 40 calculates the gas bubble diameter based on an ascent velocity (the flow velocity observed by using the transducers 21 and 22–the flow velocity observed by using the transducers 31 and 32).

The ascent velocity of a gas bubble is determined in accordance with a balance of the buoyancy force and drag. This is represented in the following formula 1. The symbol "wb" represents the velocity of the gas bubble. The symbol "wl" represents the velocity of the liquid. The symbol "Cd" represents a coefficient of drag. The symbol "ρ" represents a density difference. The symbol "g" represents acceleration of gravity. The symbol "r" represents a radius of the gas bubble.

[Formula 1]

$$\rho d \cdot g \cdot (4/3) \cdot \pi \cdot r^3 = (Cd \cdot \rho d/2) \cdot \pi \cdot r^2 (wb-wl)^2 \quad (1)$$

Also, the following formula 2 can be derived from the formula 1.

[Formula 2]

$$wb - wl = \sqrt{\frac{8 \cdot r \cdot g}{3 \cdot Cd}} \quad (2)$$

The coefficient of drag Cd is represented differently in accordance with Reynolds number Reb of the gas bubbles. However, Reynolds number Reb is used for determining a flowing state by assuming a size and flow of the gas bubble which can be actually detected by the measurement system and assuming. Reynolds number Reb can be calculated by the following formula 3. The symbol "rx" represents a radius of the gas bubble. The symbol "ub1" represents a relative velocity of the gas and the liquid. The symbol "v1" represents a dynamic coefficient of viscosity of water at 25 degrees Celsius.

[Formula 3]

$$Reb = 2 \cdot rx \cdot ub1/v1 \quad (3)$$

For example, in a case where rx=1 [mm], ub1=10 [cm/s], and v1=0.893×10$^{-6}$ [m$^2$/s], Reynolds number Reb is 22.4 in accordance with the formula 3. The region is Allen region (transition region), and the coefficient of drag Cd in Allen region is represented as the following formula 4.

[Formula 4]

$$Cd = \frac{10}{\sqrt{Reb}} = \frac{10}{\sqrt{\frac{2 \cdot r \cdot (wb-wl)}{v1}}} \quad (4)$$

Further, solving the formula 4 for the radius r of the gas bubble, the following formula 5 is derived.

[Formula 5]

$$r = \frac{50 \cdot v1}{Cd^2 \cdot (wb-wl)} \quad (5)$$

As is evident in the formula 5, the calculation controller 40 calculates the flow velocity wl of the liquid in the horizontal pipe line 12 and the flow velocity wb of the gas bubble in the vertical pipe line 11 so that the calculation controller 40 can calculate the radius r of the gas bubble.

Figure 3:
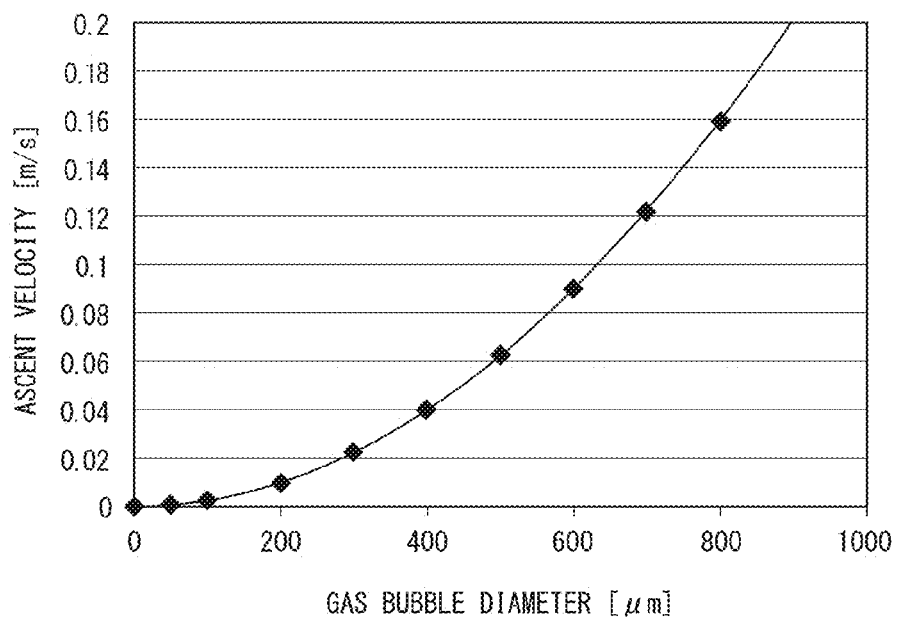
FIG. 3 is a drawing illustrating a relation between the diameter of the gas bubble and the ascent velocity of the gas bubble.

The calculation controller 40 may calculate the radius r of the gas bubble based on Stokes' law which represents a relation between the diameter of the gas bubble and the ascent velocity of the gas bubble shown in FIG. 3.

In a case of a solid particle different from the gas bubble, there is a case that a velocity of the solid particle is lower than the velocity of the fluid because of gravity. In this case, in a solid particle diameter measurement routine, the calculation controller 40 assumes the particle density so that the calculation controller 40 can calculate a diameter of the solid particle.

A solid particle (for example, mineral such as coal), of which specific weight is greater than that of fluid such as water, has a property of sinking in liquid. As shown in FIG. 2, in a case where the solid particle, of which specific weight is greater than that of fluid, exists in the vertical pipe line 11 on which the transducers 21 and 22 are disposed, the velocity which is observed by using the transducers 21 and 22 is lower than the velocity which is observed by using the transducers 31 and 32. In accordance with this property, same as the case of the gas bubble, the calculation controller 40 can measure solid particle amount in the fluid.

Figure 4:
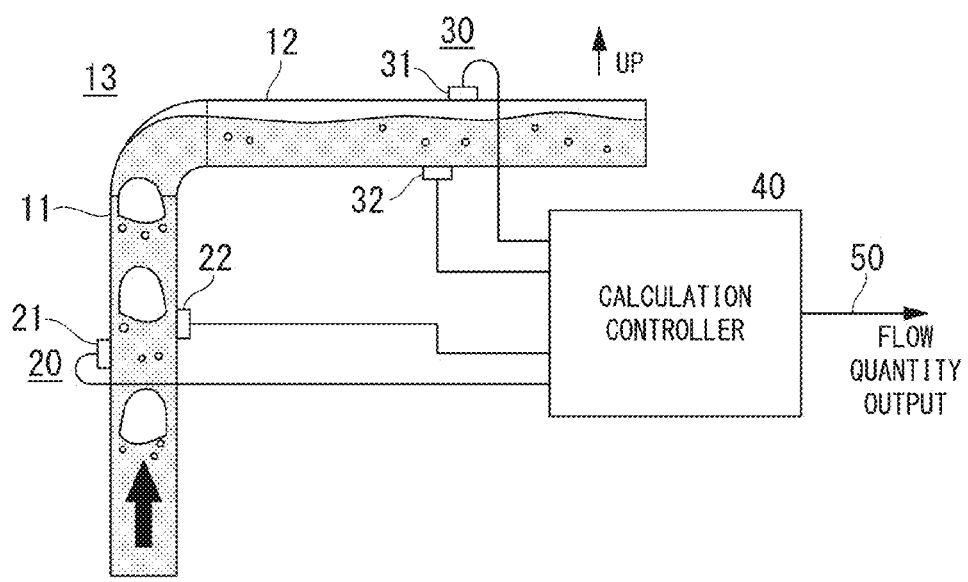
FIG. 4 is a drawing illustrating the slug flow in the pipe line.
Figure 5A:
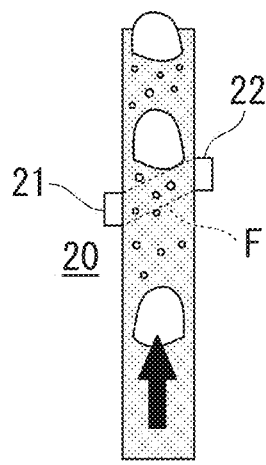
FIG. 5A is a drawing illustrating the slug flow at a time of detecting a small gas bubble.
Figure 5B:
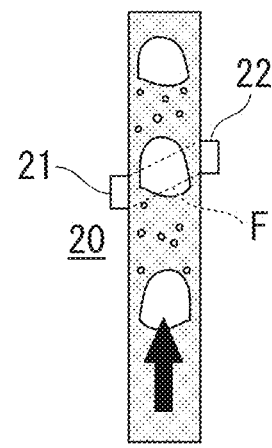
FIG. 5B is a drawing illustrating the slug flow at a time of detecting a large gas bubble.
Figure 6:
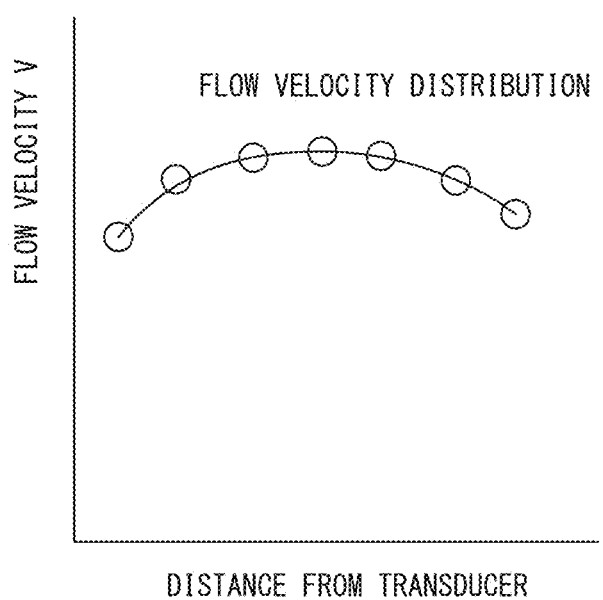
FIG. 6 is a drawing for describing a measurement operation of the slug flow.

The slug flow mode will be described below. FIG. 4 is a drawing illustrating the slug flow in the pipe line. FIG. 5A is a drawing illustrating the slug flow at a time of detecting a small gas bubble. FIG. 5B is a drawing illustrating the slug flow at a time of detecting a large gas bubble. FIG. 6 is a drawing for describing a measurement operation of the slug flow.

As shown in these drawings, the slug flow is a flow in which a large gas bubble and a small gas bubble flow alternately. Specifically, in the slug flow, small gas bubbles flow after a large gas bubble flows, thereafter, a large gas bubble flows again.

In FIG. 5A and FIG. 5B, the ultrasonic wave passes through a path F between the transducer 21 and the transducer 22. In the slug flow mode, although a signal from the small gas bubble shown in FIG. 5A can be detected by using the reflection correlation method, a reflection signal from the large gas bubble shown in FIG. 5B cannot be detected. Therefore, the quantity of the gas bubble is assumed in accordance with the signal from the small gas bubble detected by using the reflection correlation method.

In the reflection correlation method, the calculation controller 40 calculates flow velocities at a plurality of positions along the path F in accordance with moving velocities of the reflection signals from the gas bubbles, so as to calculate the flow profile shown in FIG. 6. The circles which are shown in FIG. 6 represent measurement points. In FIG. 6, the horizontal axis indicates a distance from the transducer, and the vertical axis indicates the flow velocity.

FIG. 7A is a magnified view of the pipe line in which the slug flow exists. FIG. 7B is a conceptual diagram of signal detection by the transducers 21 and 22 in the slug flow shown in FIG. 4. The first flow quantity measurer 20 alternately detects the liquid and the gas of the gas bubble flowing in the vertical pipe line 11. However, the second flow quantity measurer 30 constantly detects the liquid which flows continuously in the horizontal pipe line 12.

Figure 8A:
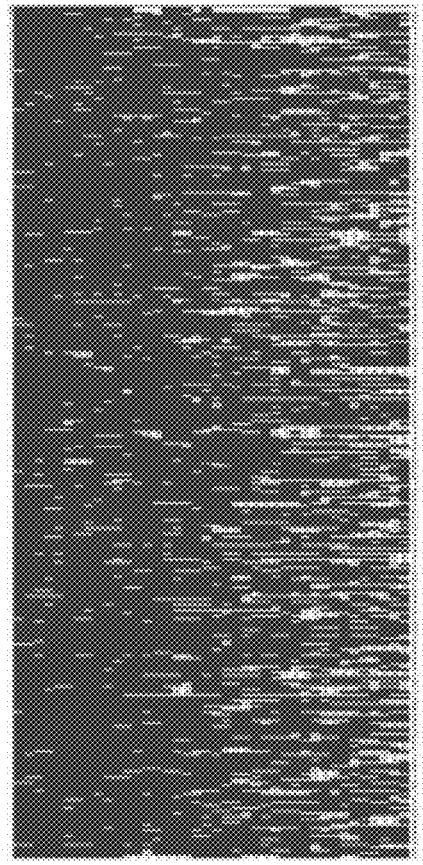
FIG. 8A is a drawing illustrating data detection frequency in a case where the quantity of the gas bubble is 40 [%].
Figure 8B:
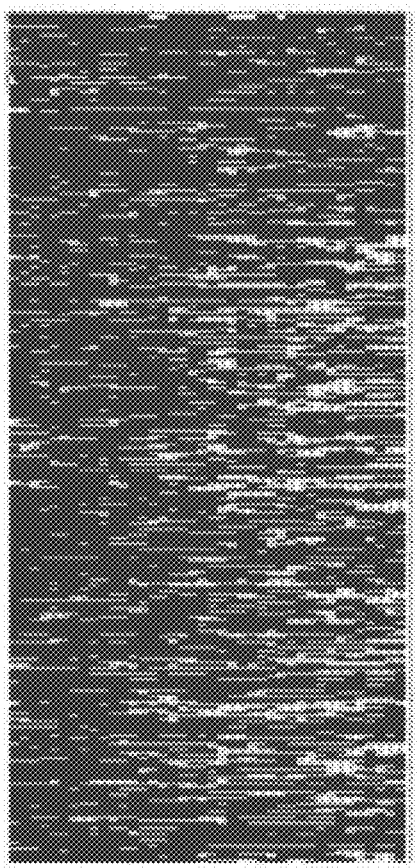
FIG. 8B is a drawing illustrating data detection frequency in a case where the quantity of the gas bubble is 20 [%].

FIG. 8A is a drawing illustrating data detection frequency in a case where the quantity of the gas bubble is 40 [%]. FIG. 8B is a drawing illustrating data detection frequency in a case where the quantity of the gas bubble is 20 [%]. In FIG. 8A and FIG. 8B, the horizontal axis indicating areas divided into arbitrary number in accordance with the distance from the transducer, and the vertical axis indicates a number of sampling.

In FIG. 8A and FIG. 8B, data of a single horizontal row can be obtained at a single profile sampling. Areas in which data exists are displayed as white cells, and areas in which data does not exist (data cannot be measured) are displayed as black cells. In the slug flow mode described above, the black cell areas represent areas in which the large gas bubble exists, and the white cell areas represent areas in which the small gas bubble exists.

Strictly, although an area in which the gas bubble does not exist is displayed as the black cell, because the slug flow includes a lot of gas bubbles, substantially, there is no need to consider the area in which the gas bubble does not exist. As is evident in FIG. 8A and FIG. 8B, in a case where the quantity of the gas bubbles is small, the white area increases. On the other hand, in a case where the quantity of the gas bubbles is large, the black area increases.

For example, 40 measurement points is measured in one profile. In a case where a number of available data is less than 10, the calculation controller 40 determines that it is an area in which the large gas bubble passes through. In a case where the number of the available data is equal to or more than 10, the calculation controller 40 determines that it is an area in which the small gas bubbles pass through. The calculation controller 40 performs the sampling repeatedly so that the calculation controller 40 can assume the quantity of the gas which flows as the fluid based on a ratio of the large gas bubble and the small gas bubble.

Actually, at a time of signal processing, the calculation controller 40 performs the calculation while the signal is not detected. For the reason, a signal undetected part, in which the quantity of the gas bubble is not measured, exists. The calculation controller 40 assumes that the quantity of the gas bubble in the signal undetected part is equal to the measurement result of the quantity of the gas bubble in a signal detected part, so that the calculation controller 40 can finally calculate entire quantity of the fluid.

Figure 9:
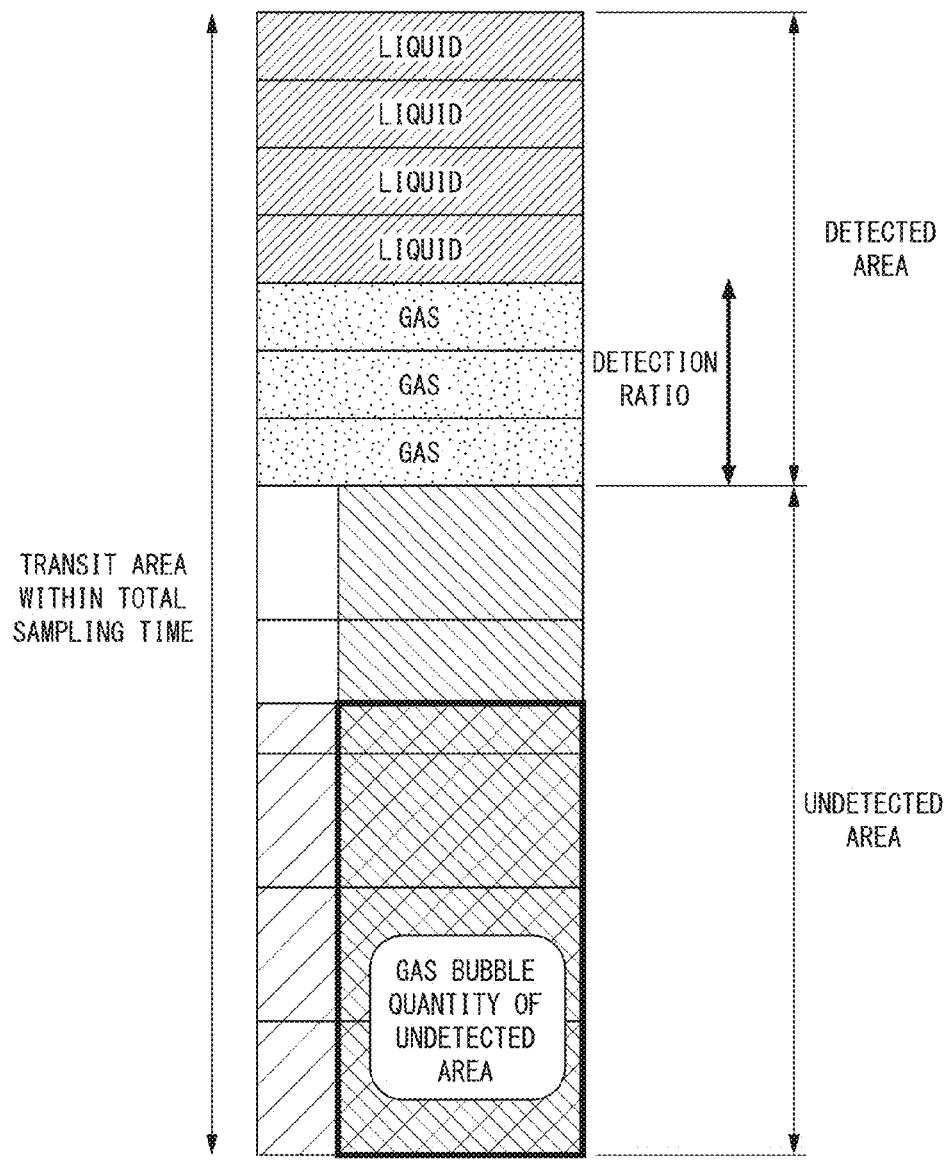
FIG. 9 is a drawing illustrating algorithm at a time of measuring the slug flow.

FIG. 9 is a drawing illustrating algorithm at a time of measuring the slug flow. As shown in FIG. 9, the calculation controller 40 calculates a ratio of signal undetected time (undetected area) to entire calculation time, and the calculation controller 40 assumes that the quantity of the gas bubble in the undetected area is equal to the quantity of the gas bubble in the detected area. Also, the calculation controller 40 assumes that a set values B of data number, shown in FIG. 15 which will be described later, represents a spatial quantity of the gas bubble in one detection cycle, and the product of these values is the quantity of the gas bubble.

Figure 10:
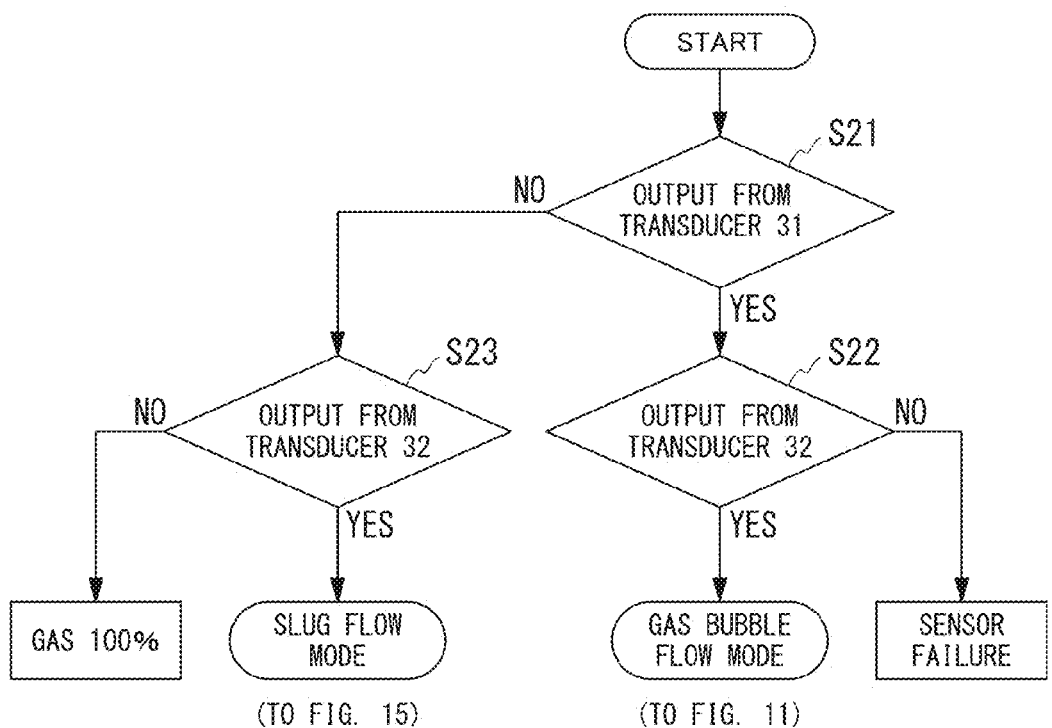
FIG. 10 is a flowchart illustrating the operation shown in FIG. 1.

FIG. 10 is a flowchart illustrating the operation shown in FIG. 1. First, the calculation controller 40 determines a flow mode based on a combination of output signals received from the transducers 31 and 32 which are disposed on the horizontal pipe line 12.

Specifically, the calculation controller 40 determines whether the output signal is received from the transducer 31 or not (step S21). In a case where the output signal is received from the transducer 31 (step S21: YES), the calculation controller 40 determines whether the output signal is received from the transducer 32 or not (step S22). In a case where the output signal is received from the transducer 32 (step S22: YES), the calculation controller 40 determines that the mode is the gas bubble flow mode. On the other hand, in a case where the output signal is not received from the transducer 32 (step S22: NO), the calculation controller 40 determines that sensor failure is happened. The operation in the gas bubble flow mode will be described by using the flowchart shown in FIG. 11.

In the step S21, in a case where the output signal is not received from the transducer 31 (step S21: NO), the calculation controller 40 determines whether the output signal is received from the transducer 32 or not (step S23). In a case where the output signal is received from the transducer 32 (step S23: YES), the calculation controller 40 determines that the mode is the slug flow mode. On the other hand, in a case where the output signal is not received from the transducer 32 (step S23: NO), the calculation controller 40 determines that the gas amount is one hundred percent. The operation in the slug flow mode will be described by using the flowchart shown in FIG. 15.

Figure 11:
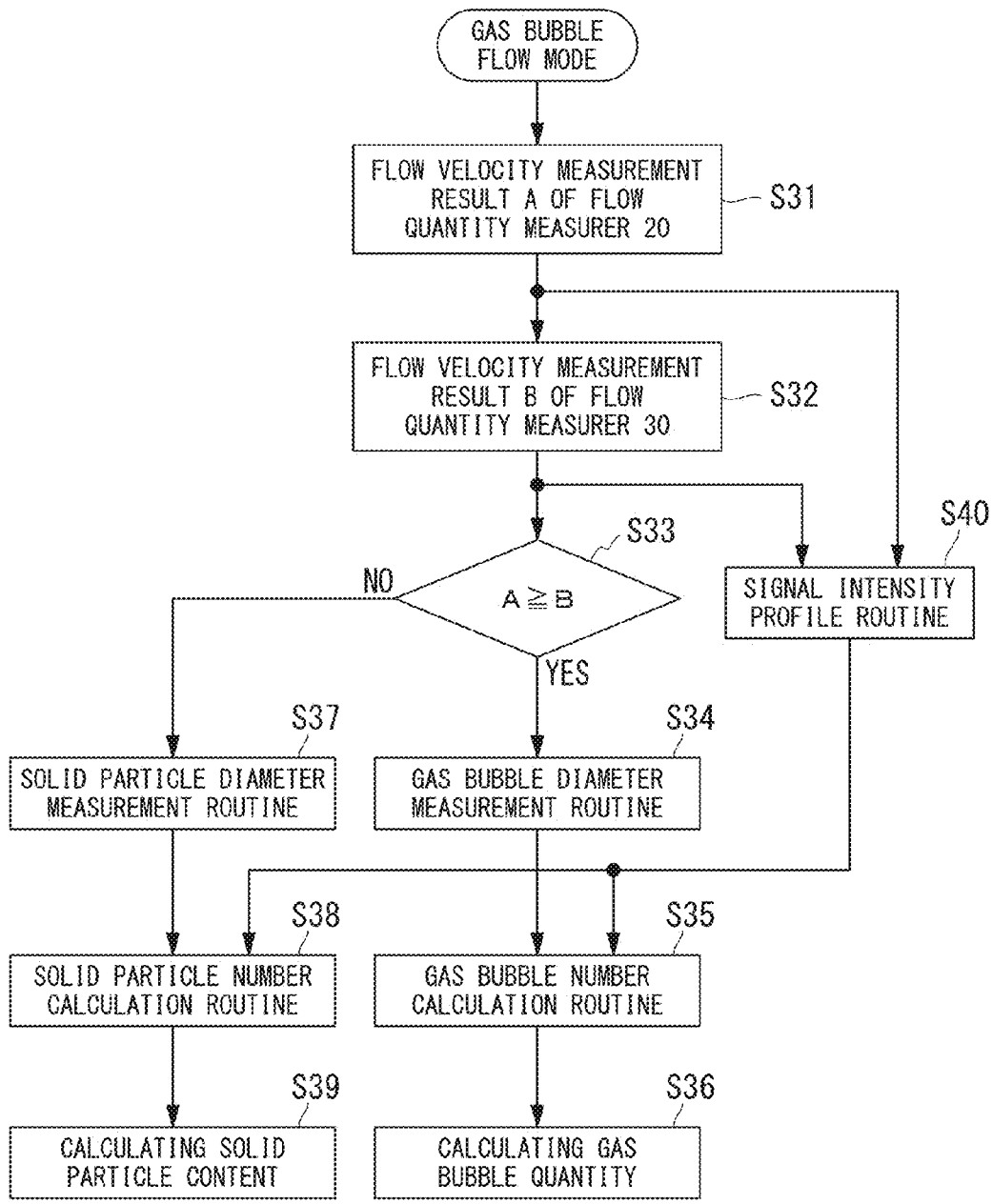
FIG. 11 is a flowchart illustrating the operation in the gas bubble flow mode.

FIG. 11 is a flowchart illustrating the operation in the gas bubble flow mode. First, the calculation controller 40 calculates a flow velocity measurement result A of the first flow quantity measurer 20 (step 31). Next, the calculation controller 40 calculates a flow velocity measurement result B of the second flow quantity measurer 30 (step 32). The calculation controller 40 compares the flow velocity measurement result A of the first flow quantity measurer 20 and the flow velocity measurement result B of the second flow quantity measurer 30, and the calculation controller 40 determines whether or not A is equal to or more than B (step S33).

In a case where A is equal to or more than B (step S33: YES), the calculation controller 40 determines that the gas bubble exists, and processing proceeds to the gas bubble diameter measurement routine (step S34). On the other hand, in a case where A is not equal to and more than B (step S33: NO), the calculation controller 40 determines that the solid particle exists, and processing proceeds to the solid particle diameter measurement routine (step S37).

In the gas bubble diameter measurement routine, the calculation controller 40 performs a process of the gas bubble number calculation routine (step S35). Thereafter, the calculation controller 40 calculates the quantity of the gas bubble (step S36). In the solid particle diameter measurement routine, the calculation controller 40 performs a process of the solid particle number calculation routine (step S38). Thereafter, the calculation controller 40 calculates the solid particle content (step S39). The calculation controller 40 can calculate the diameter of the solid particle based on Stokes' law which represents a relation between sinking velocity and the diameter of the solid particle.

As another method for calculating the diameter of the solid particle, regarding the solid particle as rigid, the calculation controller 40 may use a table (Stenzel's reflection coefficient) which represents a relation between a reflection coefficient and the diameter of the solid particle so as to calculate the diameter of the solid particle in accordance with an absolute value of an amplitude of the reflection signal.

Also, by using the first flow quantity measurer 20 and the second flow quantity measurer 30, the calculation controller 40 performs a process of the signal intensity profile routine (step S40) in which a profile of the amplitude of the reflection signal from the gas bubble is obtained. Thereafter, the calculation controller 40 inputs the result of the signal intensity profile routine to the gas bubble number calculation routine (step S35) and the solid particle diameter measurement routine (step S37), and the calculation controller 40 reflects it.

Figure 12:
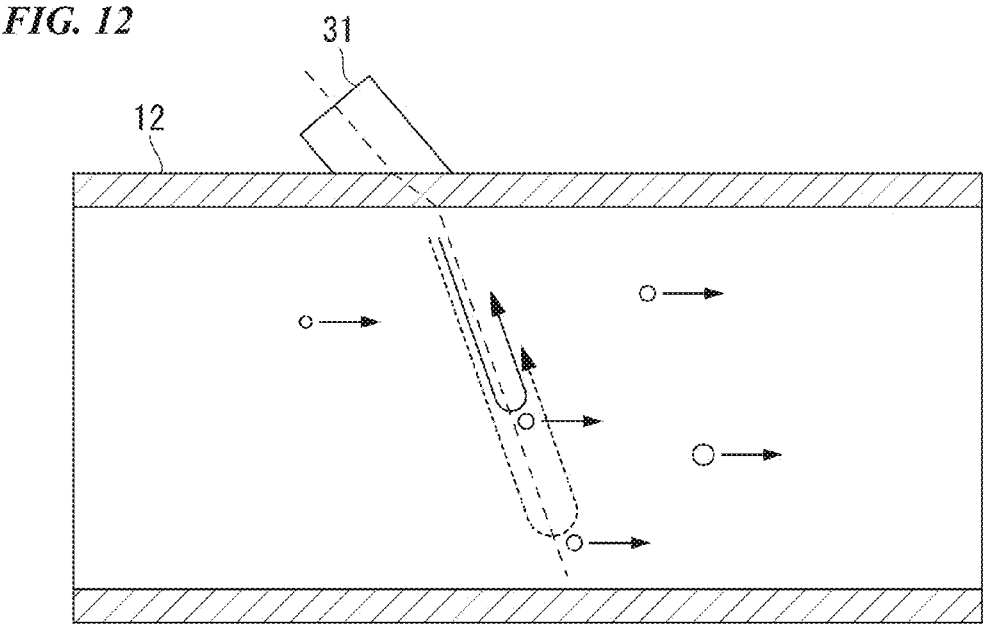
FIG. 12 is a drawing for describing a method of obtaining the profile of the amplitude of the reflection signal from the gas bubble.

FIG. 12 is a drawing for describing a method of obtaining the profile of the amplitude of the reflection signal from the gas bubble. FIG. 12 is a magnified view of a part of FIG. 1. In FIG. 12, the transducer 31 is disposed on the outside wall of the horizontal pipe line 12. The transducer 31 is used for detecting the reflection signal from the gas bubble.

The process of obtaining the profile of the amplitude of the reflection signal is separated from the process of measuring the flow quantity. The profile of the reflection signal amplitude represents amplitudes of reflection signals at plural positions in the pipe line, and the amplitudes are assumed from propagation time of the ultrasonic wave.

Figure 13:
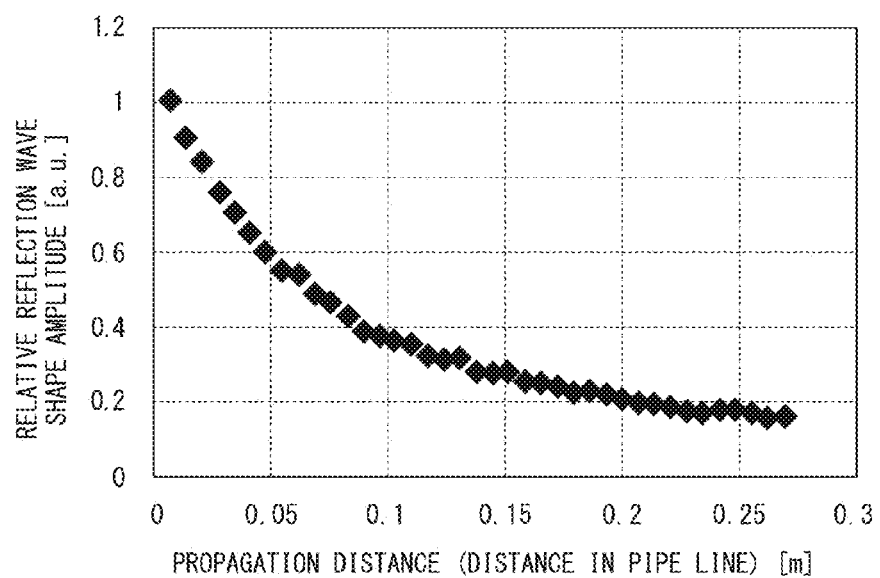
FIG. 13 is a drawing illustrating an example of the profile of the reflection signal amplitude.

FIG. 13 is a drawing illustrating an example of the profile of the reflection signal amplitude. In FIG. 13, the horizontal axis indicates the propagation distance of the ultrasonic wave, and the vertical axis indicates the amplitude (relative value) of the reflection signal of the ultrasonic wave from the gas bubble. The propagation distance 0 [m] indicates an inner wall of the transducer side.

In the gas bubble number calculation routine (step S35) shown in FIG. 11, the calculation controller 40 calculates the gas bubble number in accordance with the profile of the reflection signal amplitude and the diameter of the gas bubble. Specifically, the calculation controller 40 calculates the gas bubble number by fitting a formula, of which parameters include the gas bubble diameter and the gas bubble number, to the profile of the reflection signal amplitude. For example, the formula 6 described below is used as the formula.

[Formula 6]

$$a_{(x)}^2 \propto A_{(x)} = I_0 e^{-2Snx} \cdot (1 - e^{-Snd_x}) \cdot \text{(another member)} \quad (6)$$

In the formula 6, the symbol "a" represents the amplitude of the reflection signal of the ultrasonic wave. The symbol "A" represents intensity of the reflection signal of the ultrasonic wave. The symbol "$I_0$" represents intensity of the incident signal of the ultrasonic wave. The symbol "S" represents a cross-sectional area of the gas bubble. The symbol "r" represents the radius of the gas bubble, and the cross-sectional area S can be represented as $2\pi r^2$. The symbol "n" represents the number density of the gas bubble per unit volume. The symbol "x" represents the propagation distance x of the ultrasonic wave. The symbol "$d_x$" represents a range of extracted wave shape at a certain time. The formula 6 means that the intensity A of the reflection signal is represented as (intensity of a transmitted wave at a certain position)×(a reflection ratio of the ultrasonic wave at the certain position)×(another member).

The other member is such as an ultrasonic wave absorption member of the fluid and a diffusion member while the ultrasonic wave propagates, and a background noise. As the background noise, an actual measured value of the signal amplitude, which is observed while the ultrasonic wave does not propagates, may be used.

Figure 14:
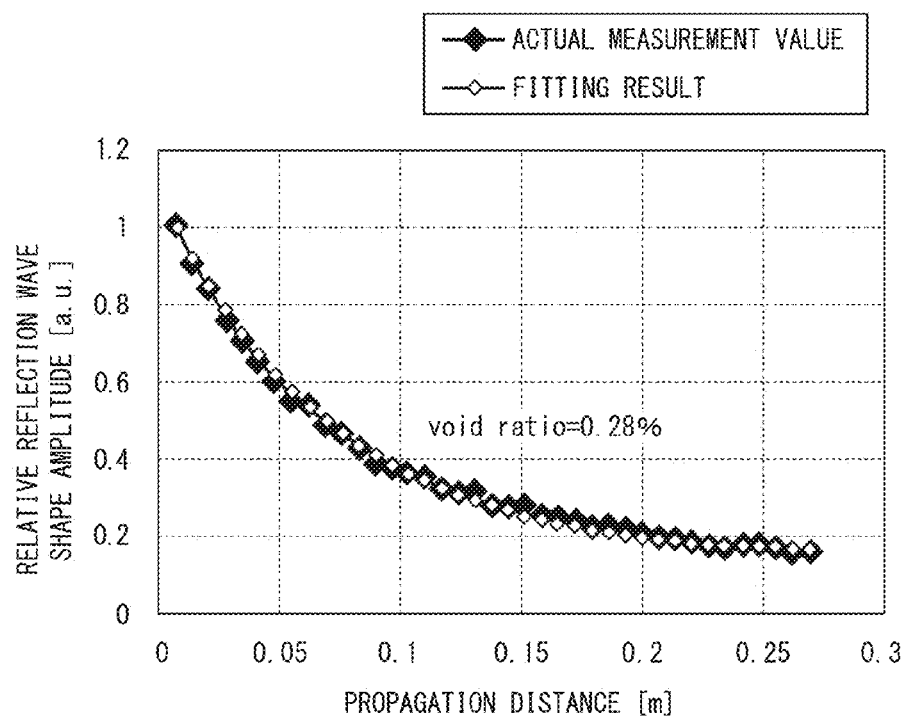
FIG. 14 is a drawing illustrating an example of fitting the profile of the reflection signal amplitude.

In the formula 6, an unknown value is only the number density n of the gas bubble. For example, as shown in FIG. 14, the calculation controller 40 may calculate the number density n of the gas bubble by fitting the formula 6 to the profile of the reflection signal amplitude. For example, the calculation controller 40 performs the fitting by using a method of least squares, but not limited thereto. The relative value may be used in the fitting, and an absolute value of the reflection signal amplitude is not needed. Therefore, there is a great advantage that not only there is no need to calculate the intensity $I_0$ and the range $d_x$, but also there is no need to consider a contact area between the pipe line and the transducer, a type of the pipe line, a thickness of the pipeline, and presence or absence of an attached substance.

FIG. 14 is a drawing illustrating an example of fitting the profile of the reflection signal amplitude. In the FIG. 14, the horizontal axis indicates a propagation distance of the ultrasonic wave in the pipe line, and the vertical axis indicates the amplitude (relative value) of the reflection signal of the ultrasonic wave from the gas bubble. Although the quantity of the gas bubble (void ratio) is used for fitting in FIG. 14, because the diameter of the gas bubble is known, the number of the gas bubble may be used for fitting instead of the quantity of the gas bubble.

Because the diameter of the gas bubble and the number of the gas bubble can be calculated as described above, the calculation controller 40 can calculate the quantity of the gas bubble as described in the flowchart of FIG. 11. As a final output, the calculation controller 40 can output the flow velocity, the flow quantity, the diameter of the gas bubble, the number of the gas bubble, and the quantity of the gas bubble.

Figure 15:
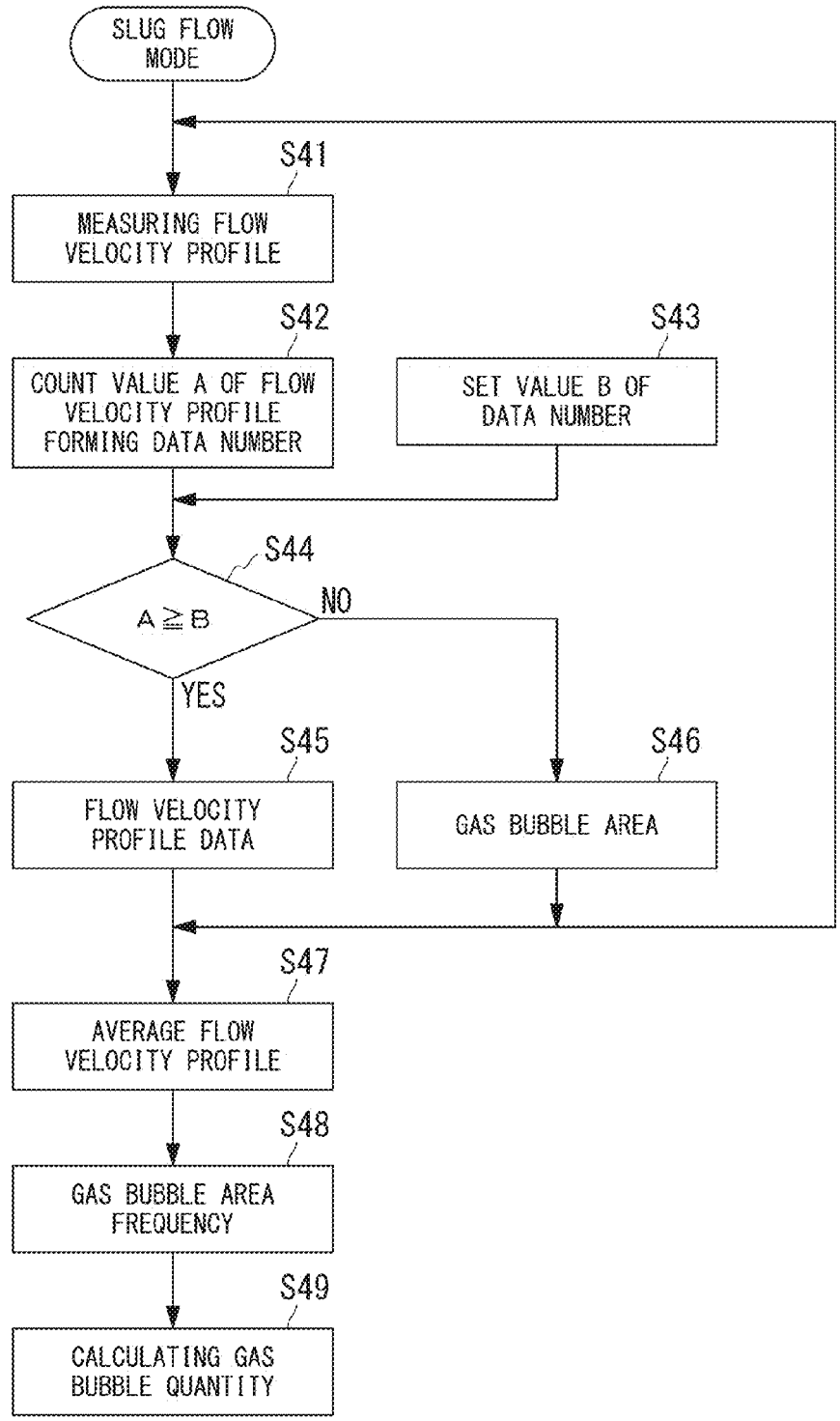
FIG. 15 is a flowchart illustrating the operation in the slug flow mode.

FIG. 15 is a flowchart illustrating the operation in the slug flow mode. First, the calculation controller 40 measures a flow velocity profile (step S41). Next, the calculation controller 40 calculates a count value A of the flow velocity profile forming data number (step S42). On the other hand, a set value B of the data number is set (step S43). The calculation controller 40 compares the count value A and the set value B, and the calculation controller 40 determines whether or not A is equal to or more than B (step S44).

In a case where A is equal to or more than B (step S44: YES), the calculation controller 40 performs a process of flow velocity profile data (step S45). On the other hand, in a case where A is not equal to and more than B (step S44: NO), the calculation controller 40 performs a process of gas bubble area (step S46).

After the process of the flow velocity profile data and the process of the gas bubble area, the calculation controller 40 performs a process of an average flow velocity profile (step S47).

Thereafter, the calculation controller 40 calculates a gas bubble area frequency (step S48), and the calculation controller 40 calculates the quantity of the gas bubble (step S49).

Such configuration makes it possible for the multiphase flowmeter to measure not only the flow quantity of fluid, but also various types of flow quantity parameters such as the diameter of the gas bubble, the number of the gas bubble, and the flow quantity of the gas bubble simultaneously by the simple configuration similar to existing ultrasonic flowmeter at low cost. Also, presence or absence of the gas bubble and the solid particle can be detected by performing the routine described in the flowchart.

Although the examples of calculating the quantity of the gas bubble and the quantity of the solid particle are described, only the diameter of the gas bubble or the solid particle may be output without the quantity of the gas bubble, also only the number of the gas bubble or the solid particle may be output.

Instead of measuring the flow quantity in the horizontal pipe line 12 by the reflection correlation method, the calculation controller 40 may measure the flow velocity of liquid in the vertical pipe line 11 and the horizontal pipe line 12 by using the transit time method so as to calculate the flow quantity of the gas bubble.

Second Embodiment

Figure 16:
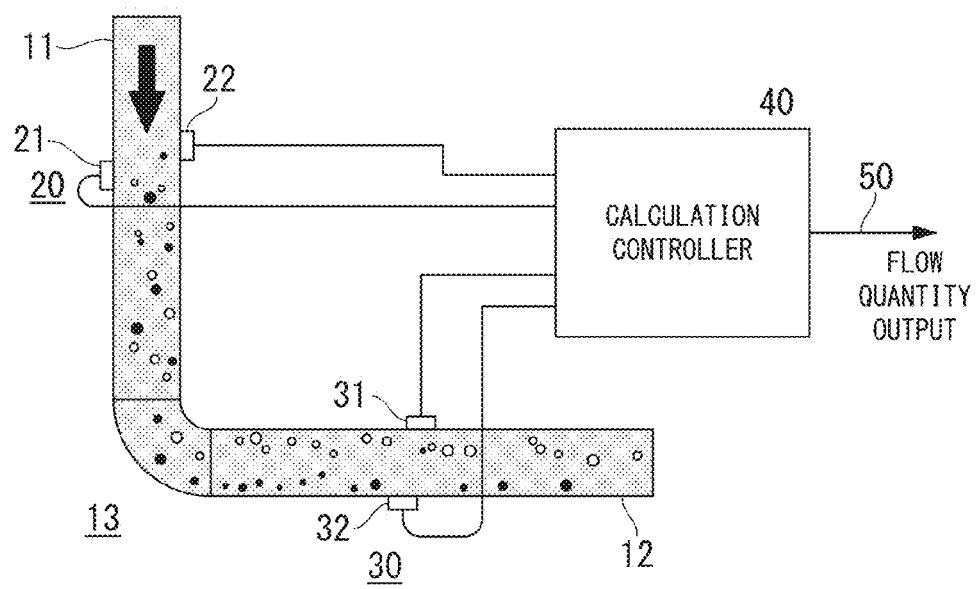
FIG. 16 is a drawing illustrating a multiphase flowmeter in a second embodiment.

FIG. 16 is a drawing illustrating a multiphase flowmeter in a second embodiment. In this drawing, parts that correspond to those in FIG. 1 are assigned the same reference numerals, and the descriptions thereof will be omitted. In FIG. 16, the pipe line 13 is equipped with the vertical pipe line 11 and the horizontal pipe line 12. Fluid flows downwardly in the vertical pipe line 11, and the fluid flows horizontally in the horizontal pipe line 12.

By the configuration shown in FIG. 16, the calculation controller 40 can determine the gas bubble and the solid particle separately. In the horizontal pipe line 12 which is disposed downstream of the vertical pipe line 11, solid particles of which density is greater than liquid are moved to the bottom side of the horizontal pipe line 12 by centrifugal force, and gas bubbles of which density is smaller than liquid are moved to the top side of the horizontal pipe line 12 by buoyancy force.

The transducers 31 and 32, which are disposed on the outside wall of the horizontal pipe line 12 so as to sandwich the horizontal pipe line 12 in the vertical direction, can be used for detecting where and how frequently the reflection signal exists in accordance with a detection frequency of the signal and position information of the signal.

In a case where many reflection signals are on the bottom side of the horizontal pipe line 12, the calculation controller 40 can determine the solid particle exists. On the other hand, in a case where many reflection signals are on the top side of the horizontal pipe line 12, the calculation controller 40 can determine the gas bubble exists. In accordance with these determination results, the calculation controller 40 can calculate the flow quantity of the gas and the quantity of the solid particle separately.

The calculation controller 40 can measure the diameter of the gas bubble by using only the transducers 21 and 22 which are disposed on the outside wall of the vertical pipe line 11 so as to sandwich the vertical pipe line 11 in the horizontal direction. Specifically, there are two method described below.

a) a method of performing the transit time method and the reflection correlation method or Doppler method in a hybrid manner by using the transducers 21 and 22. In the following, this method will be called a method of performing in a hybrid manner.

b) a method of measuring two detection terminals of the transducers 21 and 22 by using frequencies, which are different from each other respectively, by using the reflection correlation method or Doppler method. In the following, this method will be called a method of measuring by using different frequencies.

By these methods, because there is no need to dispose the transducers on the horizontal pipe line 12, the multiphase flowmeter can be simplified and costs of the multiphase flowmeter can be reduced. Also, the pipe line can be arranged without a limitation that both the horizontal pipe line 12 and the vertical pipe line 11 are needed.

a) The Method of Performing in a Hybrid Manner:

The multiphase flowmeter can measure the flow velocity of the fluid by using the reflection correlation method or Doppler method alternately and the transit time method. In a case of the reflection correlation method or Doppler method, the calculation controller 40 calculates the flow velocity based on the reflection signal from the gas bubble. On the other hand, in a case of the transit time method, because the calculation controller 40 calculates the flow velocity based on a transit time difference between the ultrasonic wave of the upstream side and the ultrasonic wave of the downstream side, the calculation controller 40 calculates the flow velocity of the fluid directly.

Figure 17:
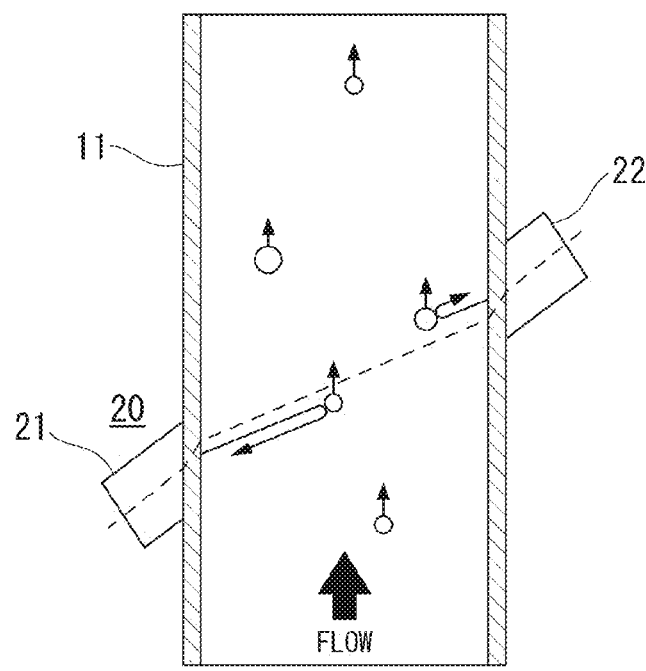
FIG. 17 is a magnified view of the vertical pipe line 11 where the attached transducers 21 and 22 are driven by different measurement methods such as the transit time method and the reflection correlation method.

FIG. 17 is a magnified view of the vertical pipe line 11 where the attached transducers 21 and 22 are driven by different measurement methods such as the transit time method and the reflection correlation method. In this embodiment, the calculation controller 40 measures an ascent velocity of the gas bubble in the vertical pipe line 11 so as to measure the diameter of the gas bubble. In FIG. 17, the transducers 21 and 22 are disposed on an outside wall of the vertical pipe line 11 so as to sandwich the vertical pipe line 11 in the horizontal direction. The transducers 21 and 22 are included in the first flow quantity measurer 20. The first flow quantity measurer 20 is a multiphase flowmeter which can measure the flow velocity of the fluid by using the reflection correlation method or Doppler method and the transit time method.

Figure 18:
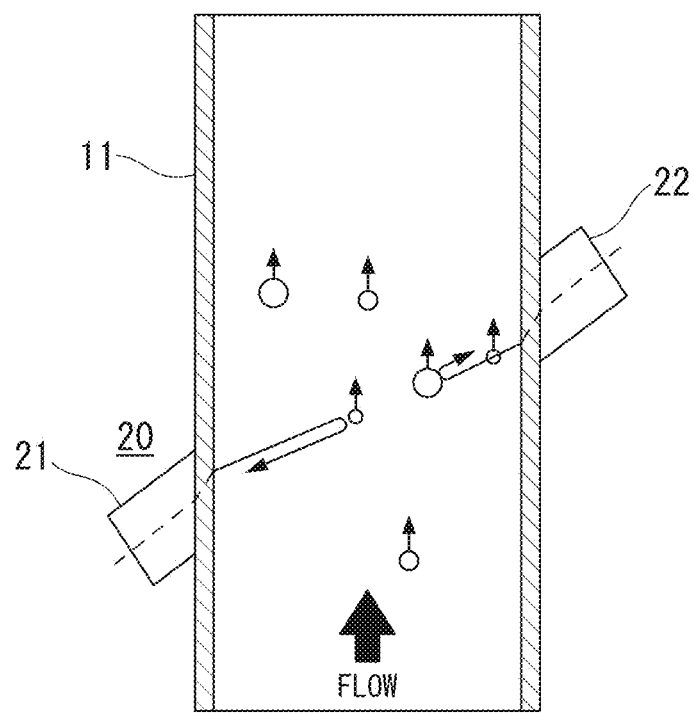
FIG. 18 is a magnified view of the vertical pipe line 11 where the drive frequency of the transducer 21 and the drive frequency of the transducer 22 are different from each other.

The flow velocity calculated by using the reflection correlation method or Doppler method can be represented as (flow velocity of the fluid)+(flow velocity caused by the buoyancy force of the gas bubble). On the other hand, because the flow velocity calculated by using the transit time method is equal to the flow velocity of the fluid, a difference of the two flow velocity represents the ascent velocity of the gas bubble. Thereafter, the calculation controller 40 calculates the diameter of the gas bubble in accordance with the flowchart of FIG. 11.

b) A Method of Measuring by Using Different Frequencies:

FIG. 18 is a magnified view of the vertical pipe line 11 where the drive frequency of the transducer 21 and the drive frequency of the transducer 22 are different from each other. In FIG. 18, the transducers 21 and 22 are disposed on an outside wall of the vertical pipe line 11 so as to sandwich the vertical pipe line 11 in the horizontal direction. A drive frequency of the transducer 21 and a drive frequency of the transducer 22 are different from each other. The high-frequency transducer 21 can generate ultrasonic waves from several hundred [kHz] to several tens [MHz]. The low-frequency transducer 22 can generate ultrasonic waves from several tens [kHz] to several [MHz].

Because a wavelength of the ultrasonic wave generated by the high-frequency transducer 21 is short, the high-frequency transducer 21 can detect the reflection signal from the small gas bubble of which buoyancy force is ignorable. Obviously, the high-frequency transducer 21 can detect the reflection signal from the large gas bubble simultaneously. On the other hand, because a wavelength of the ultrasonic wave generated by the low-frequency transducer 22 is long, the ultrasonic wave generated from the low-frequency transducer 22 passes through the small gas bubble without reflecting. For the reason, the low-frequency transducer 21 cannot detect the reflection signal from the small gas bubble.

FIG. 19A to FIG. 19D are drawings illustrating measurement data of the transducers of which frequencies are different from each other. The flow velocity profile P1 of the low-frequency transducer 22 and the flow velocity profile P2 of the high-frequency transducer 21 are compared in FIG. 19A. The profile P1 detected by the low-frequency transducer 22 can be represented as (actual flow velocity of the fluid)+(flow velocity caused by the buoyancy force of the large gas bubble).

On the other hand, the profile P2 detected by the high-frequency transducer 21 can be represented as (actual flow velocity of the fluid)+(flow velocity caused by the buoyancy force of the small gas bubble and the large gas bubble). For the reason, whichever transducer is used, the calculation controller 40 calculates the flow velocity which is greater than the actual flow velocity. Because the reflection signal detected by the high-frequency transducer 21 includes the reflection signal from the small gas bubble, the flow velocity calculated by using the high-frequency transducer 21 is lower than an average flow velocity (flow velocity of only the large gas bubble) calculated by using the low-frequency transducer 22.

Figure 19:
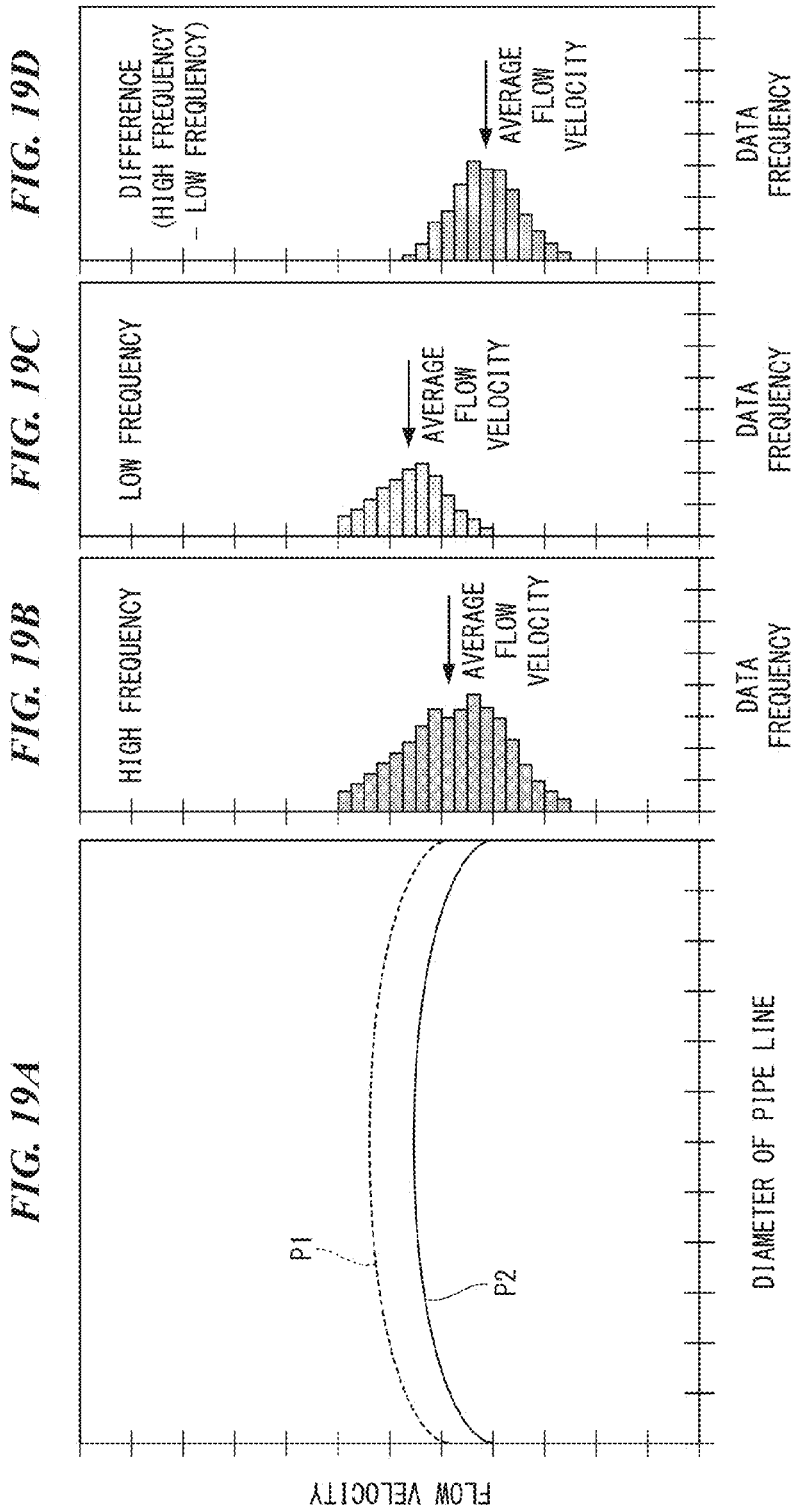
FIG. 19A is a drawing illustrating measurement data of the transducers of which frequencies are different from each other.
FIG. 19B is a drawing illustrating measurement data of the transducers of which frequency is higher than the other shown in FIG. 19C.
FIG. 19C is a drawing illustrating measurement data of the transducers of which frequency is lower than the other shown in FIG. 19B.
FIG. 19D is a drawing illustrating a difference of the two histograms shown in FIG. 19B and FIG. 19C.

In the reflection correlation method, the histograms shown in FIG. 19B to FIG. 19D can be obtained by counting a number of available data. With respect to the available data, a correlation of two or more reflection signals is obtained. As described above, a center value of the flow velocity profile detected by using the high-frequency transducer 21 corresponds to an average value of the flow velocity. Also, a center value of the flow velocity profile detected by using the low-frequency transducer 22 corresponds to an average value of the flow velocity. For the reason, a difference of the two histograms corresponds only to the reflection signals from the small gas bubble. Because the ascent velocity of the small gas bubble affected by the buoyancy force is negligible small, the flow velocity obtained in accordance with the difference can be regarded as the velocity of the fluid.

As described above, the calculation controller 40 regards the flow velocity profile obtained by using the low-frequency transducer 22 as the velocity of the gas bubble of which diameter is typical, and the calculation controller 40 regards the velocity of the small gas bubble obtained in accordance with the difference of the histograms as the flow velocity of the fluid, so that the calculation controller 40 can calculate the ascent velocity of the typical gas bubble in accordance with the difference between the average velocity shown in FIG. 19B and the average velocity shown in FIG. 19C. Thereafter, the calculation controller 40 performs processes same as the processes shown in FIG. 11.

Instead of measuring the flow quantity in the horizontal pipe line 12 by using the reflection correlation method, measurement results from another flowmeter such as a Coriolis flowmeter may be used.

Figure 20:
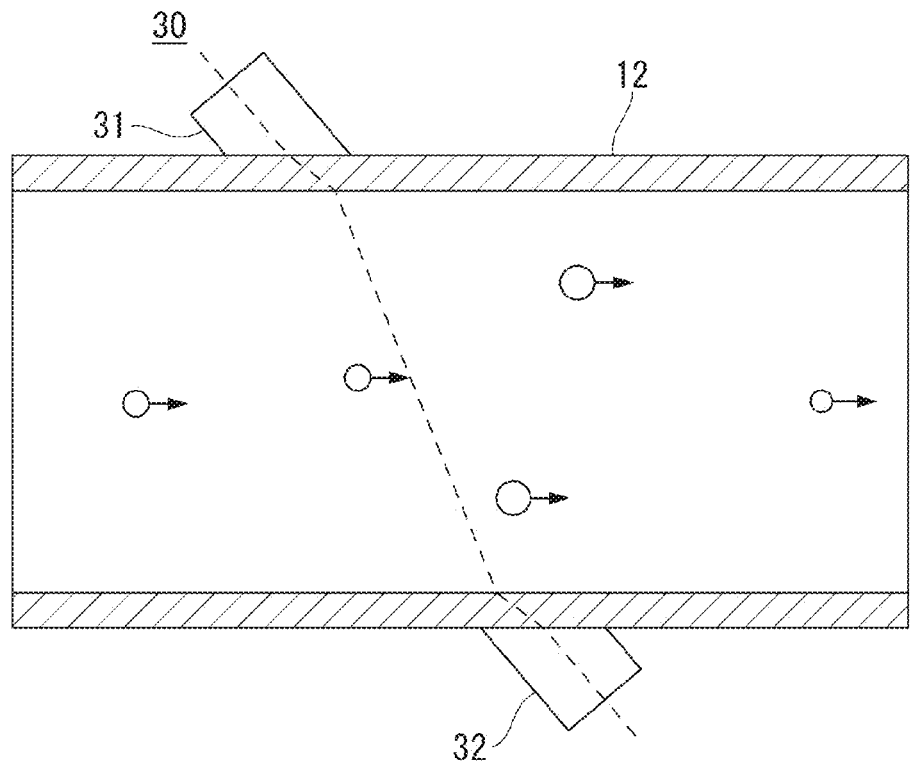
FIG. 20 is a drawing for describing the transit time method.
Figure 21A:
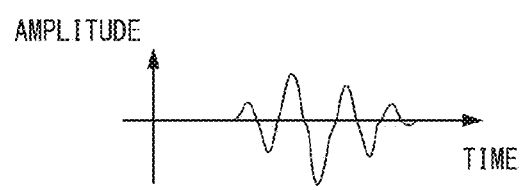
FIG. 21A is a drawing illustrating the amplitude of the signal when the quantity of the gas bubble is low.
Figure 21B:
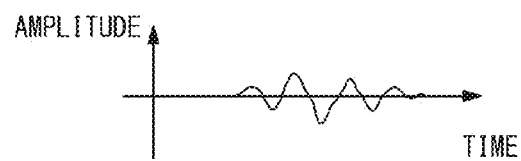
FIG. 21B is a drawing illustrating the amplitude of the signal when the quantity of the gas bubble is great.

The calculation controller 40 may calculate signal decay in the gas bubble flow mode by using the transit time method. Specifically, the process of obtaining the profile of the reflection signal amplitude shown in FIG. 12 is changed to the process of calculating the quantity of the gas bubble. FIG. 20 is a drawing for describing the transit time method. FIG. 21A is a drawing illustrating the amplitude of the signal when the quantity of the gas bubble is low. FIG. 21B is a drawing illustrating the amplitude of the signal when the quantity of the gas bubble is great. As shown in these drawings, the greater the quantity of the gas bubble is, the lower the amplitude of the transmitted wave observed by using the transit time method is. The calculation controller 40 may calculate the quantity of the gas bubble in accordance with a reduction amount of the amplitude. In this case, the amplitude t of the transmitted wave is represented as following formula 7. The symbol "T" represents intensity of the transmitted wave.

[Formula 7]

$$t_{(x)}^2 \propto T_{(x)} = I_0 e^{-2Snx} \cdot (\text{another member}) \quad (7)$$

In a case of calculating the quantity of the gas bubble in accordance with the amplitude of the transmitted wave, differing from the case of the profile of the reflection signal amplitude, there is a need to know preliminarily the amplitude of the transmitted wave which is detected when the gas bubble does not exist. The calculation controller 40 calculates the amplitude of the transmitted wave, which is detected when the gas bubble does not exist, by using one of a method 1) and a method 2) described below.

1) The calculation controller 40 calculates an absolute value of the amplitude based on the formula 6. In this case, because $I_0$ is a value determined in accordance with a condition of the pipe line, a data table for determining $I_0$ may be stored in a memory disposed in the calculation controller 40, or the calculation controller 40 may calculate $I_0$ in accordance with a predetermined formula.

2) As more reliable method, there is a method of storing the amplitude of the transmitted wave, which is detected when the gas bubble does not exist, in the memory disposed in the calculation controller 40. For example, the calculation controller 40 may obtain the amplitude of the transmitted wave while the process of the plant is stopped, because the gas bubble does not exist in the fluid when a certain time has elapsed since the process of the plant was stopped.

According to at least one of the above-described embodiments, the multiphase flowmeter can measure the flow quantity of liquid, gas, and solid particles which are mixed in the multiphase fluid by a simple configuration at low cost.

Third Embodiment

Figure 22:
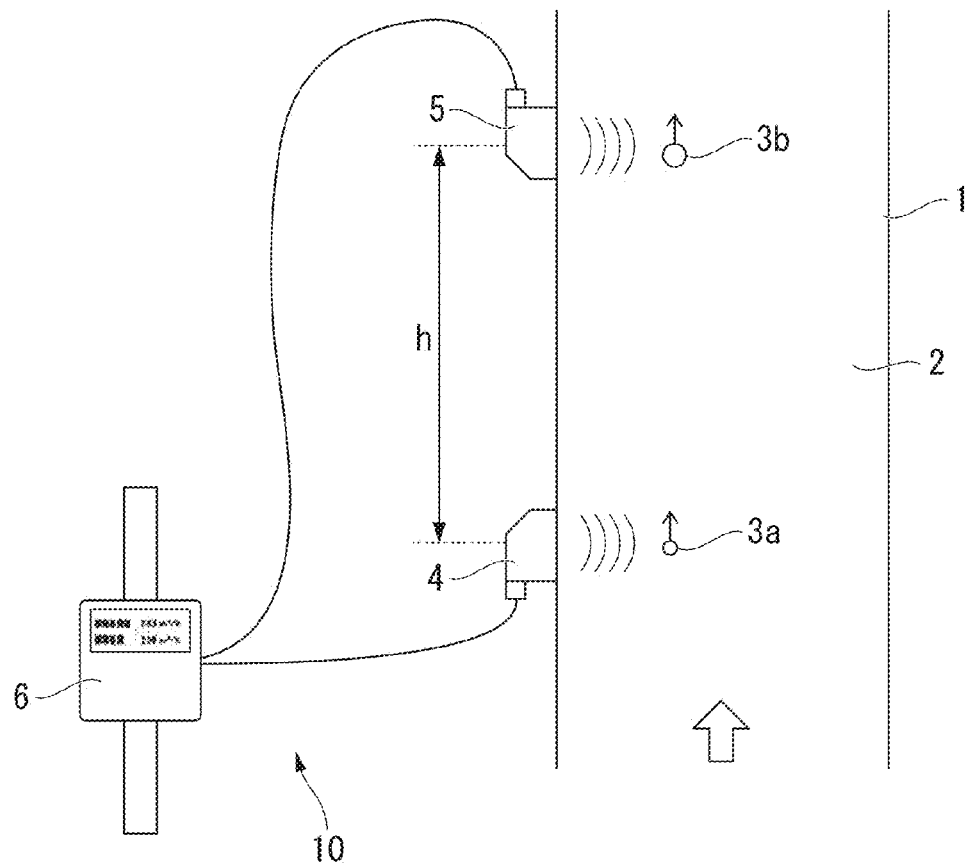
FIG. 22 is a drawing illustrating a multiphase flowmeter in a third embodiment.

Third embodiment is another embodiment of the gas bubble flow mode (step S22: YES in FIG. 10). FIG. 22 is a drawing illustrating a multiphase flowmeter in a third embodiment. A pipe line is installed in a plant. The pipe line includes a vertical pipe line and a horizontal pipe line which are adjacent to each other. In FIG. 22, fluid 2 flows upwardly in the vertical pipe line 1 at a velocity v. Gas bubbles 3a and 3b are included in the fluid 2. A multiphase flowmeter 10 is equipped with an upstream detector 4 (first detector) and a downstream detector 5 (second detector).

The upstream detector 4 and the downstream detector 5 are disposed on an outside wall of the vertical pipe line 1 at a distance of height h. Also, the upstream detector 4 and the downstream detector 5 are disposed along a flow direction of the fluid 2. The upstream detector 4 and the downstream detector 5 are connected to a converter 6 (calculator).

The upstream detector 4 transmits an ultrasonic wave (first ultrasonic wave) to the fluid 2. When the ultrasonic wave which is transmitted by the upstream detector 4 is reflected by the gas bubble 3a included in the fluid 2, the upstream detector 4 receives the reflected ultrasonic wave as a reflection signal (first reflection signal). After that, the upstream detector 4 transmits the reflection signal to the converter 6.

Same as the upstream detector 4, the downstream detector 5 transmits an ultrasonic wave (second ultrasonic wave) to the fluid 2. When the ultrasonic wave which is transmitted by the downstream detector 5 is reflected by the gas bubble 3b included in the fluid 2, the downstream detector 5 receives the reflected ultrasonic wave as a reflection signal (second reflection signal). After that, the downstream detector 5 transmits the reflection signal to the converter 6.

The converter 6 receives the reflection signal (first reflection signal) which is transmitted by the upstream detector 4 and the reflection signal (second reflection signal) which is transmitted by the downstream detector 5. The converter 6 calculates a flow velocity based on the received reflection signals by using a method such as the reflection correlation method or Doppler method. Also, the converter 6 obtains amplitude of the reflection signal which is transmitted by the upstream detector 4 and amplitude of the reflection signal which is transmitted by the downstream detector 5.

The downstream detector 5 is disposed higher than the upstream detector 4 by the height h. For the reason, when a size of the gas bubble 3a which passes the upstream detector 4 and a size of the gas bubble 3b which passes the downstream detector 5 are compared, the gas bubble 3b is larger than the gas bubble 3a by head pressure.

The converter 6 calculates measurement data and accumulates the measurement data. Also, the converter 6 displays and outputs a calculation result. The converter 6 is connected to outside via a cable for the purpose of being supplied electrical power from the outside, outputting signals of 4-20 [mA] to the outside, and communicating with the outside.

Because the converter 6 calculates flow velocities of the gas bubbles 3a and 3b which are reflectors included in the fluid 2 by using the reflection correlation method and the Doppler method, the upstream detector 4 and the downstream detector 5 detect a flow velocity represented by (flow velocity of the fluid 2)+(flow velocity caused by buoyancy force).

Figure 23:
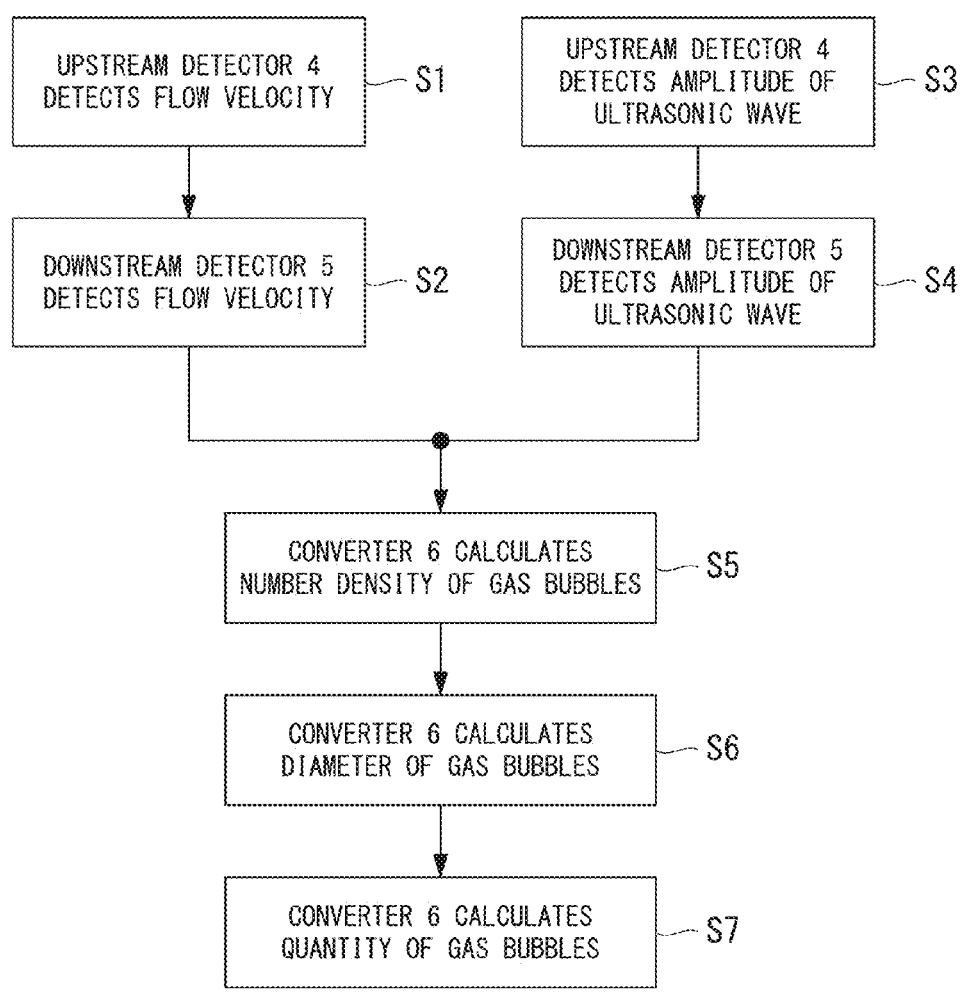
FIG. 23 is a flowchart illustrating processes for calculating a quantity of the gas bubbles in the gas bubble flow mode.

FIG. 23 is a flowchart illustrating processes for calculating a quantity of the gas bubbles in the gas bubble flow mode. First, the upstream detector 4 detects the flow velocity (step S1). Next, the downstream detector 5 detects the flow velocity (step S2). On the other hand, the upstream detector 4 detects ultrasonic wave amplitude (step S3). Next, the downstream detector 5 detects ultrasonic wave amplitude (step S4).

After that, the converter 6 sequentially calculates a number density of the gas bubbles (step S5), a diameter of the gas bubble (step S6), and a quantity of the gas bubbles (step S7).

Figure 24A:
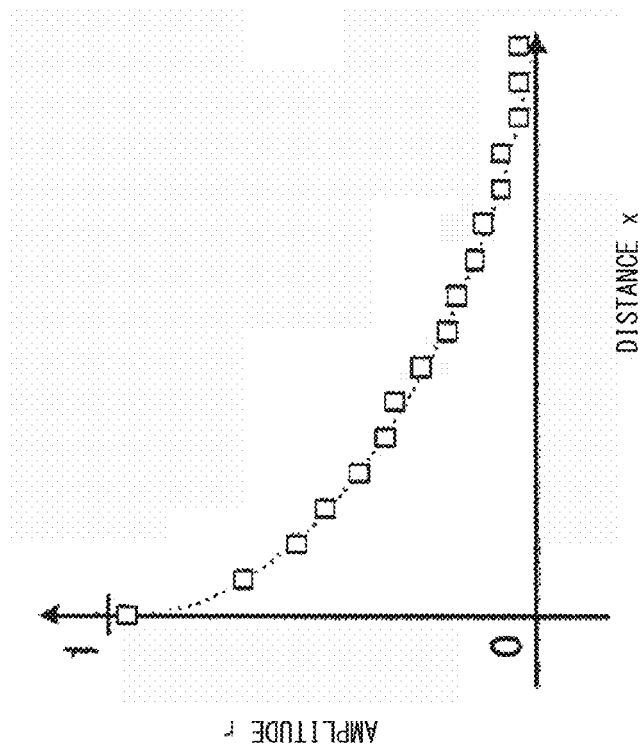
FIG. 24A is a distribution chart illustrating the ultrasonic wave amplitude detected by the upstream detector 4.
Figure 24B:
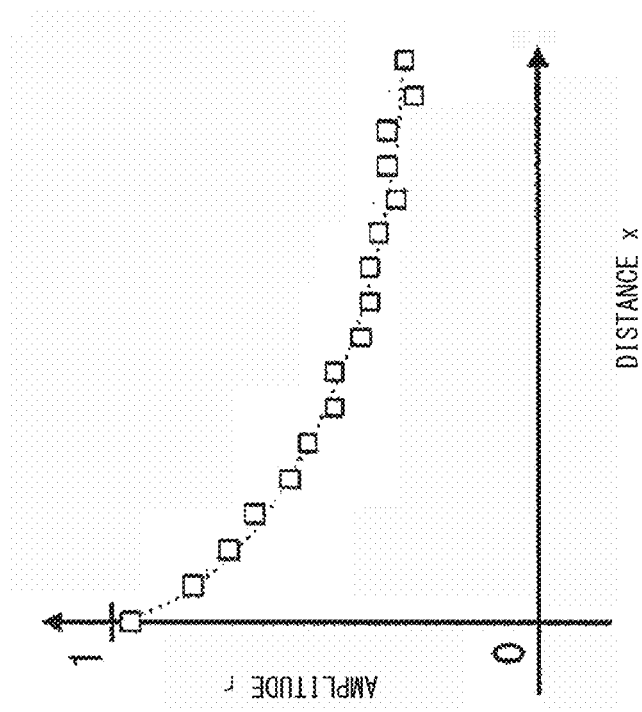
FIG. 24B is a distribution chart illustrating the ultrasonic wave amplitude detected by the downstream detector 5.

FIG. 24A is a distribution chart illustrating the ultrasonic wave amplitude (first amplitude) detected by the upstream detector 4. FIG. 24B is a distribution chart illustrating the ultrasonic wave amplitude (second amplitude) detected by the downstream detector 5. In FIG. 24A and FIG. 24B, the horizontal axis represents a propagation distance x of the ultrasonic wave, and the vertical axis represents amplitude r of the ultrasonic wave.

When comparing the flow velocity which is detected by the upstream detector 4 and the flow velocity which is detected by the downstream detector 5, because the gas bubble 3b is larger than the gas bubble 3a, the flow velocity which is detected by the downstream detector 5 is faster than the flow velocity which is detected by the upstream detector 4 by the buoyancy force of the gas bubble 3b.

On the other hand, when comparing the ultrasonic wave amplitude which is detected by the upstream detector 4 and the ultrasonic wave amplitude which is detected by the downstream detector 5, because the gas bubble 3b is larger than the gas bubble 3a, as shown in FIG. 24B, the ultrasonic wave amplitude which is detected by the downstream detector 5 attenuates more than the ultrasonic wave amplitude which is detected by the upstream detector 4 with respect to the propagation distance x of the ultrasonic wave.

The following formula 8 is a theoretical formula representing amplitude $r_0(x)$ of the ultrasonic wave which is detected by the upstream detector 4. The symbol "$I_0$" represents incident intensity of the ultrasonic wave. The symbol "$A_0$" represents a cross-sectional area of the gas bubble which is detected by the upstream detector 4. The symbol "n" represents number density [number/m$^3$] of the gas bubble. The symbol "x" represents the propagation distance x of the ultrasonic wave in the fluid. The symbol "$\alpha_0$" represents an attenuation constant of liquid. The symbol "f" represents a frequency of the ultrasonic wave.

[Formula 8]

$$r_0(x) \propto I_0 e^{-A_0 n x} \cdot e^{-2(\alpha_0 f^2)x} \qquad (8)$$

The following formula 9 is a theoretical formula representing amplitude $r_1(x)$ of the ultrasonic wave which is detected by the downstream detector 5. The symbol "$A_1$" represents a cross-sectional area of the gas bubble which is detected by the upstream detector 4.

[Formula 9]

$$r_1(x) \propto I_0 e^{-A_1 n x} \cdot e^{-2(\alpha_0 f^2)x} \qquad (9)$$

Figure 25:
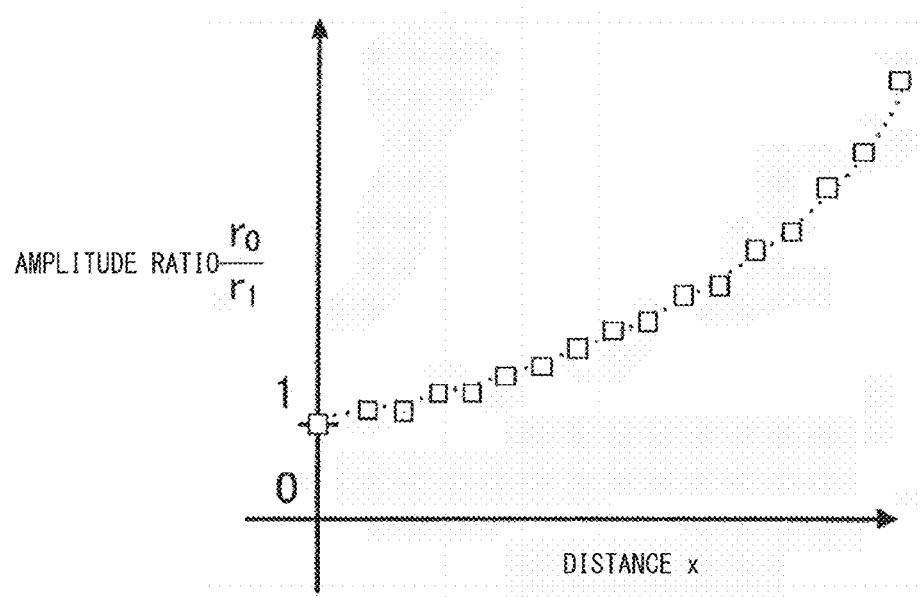
FIG. 25 is a drawing illustrating an amplitude ratio of the amplitude $r_0$ to the amplitude $r_1$ with respect to the propagation distance x of the ultrasonic wave.

FIG. 25 is a drawing illustrating an amplitude ratio of the amplitude $r_0$ to the amplitude $r_1$ with respect to the propagation distance x of the ultrasonic wave. The converter 6 calculates the amplitude ratio $r_0/r_1$ (the plots of FIG. 25) based on the formula 8 and the formula 9.

A theoretical formula of FIG. 25 is represented by the following formula 10. The symbol "$\rho$" represents a dynamic coefficient of viscosity of the fluid. The symbol "g" represents acceleration of gravity. The symbol "$v_0$" represents the flow velocity which is detected by the upstream detector 4. The symbol "$v_1$" represents the flow velocity which is detected by the downstream detector 5.

[Formula 10]

$$\frac{r_0}{r_1}(x) \propto \exp\left\{\frac{9\rho\pi}{2g}(v_1 - v_0)nx\right\} \qquad (10)$$

In the formula 10, $(v_1-v_0)$ represents a flow velocity difference between the flow velocity which is detected by the upstream detector 4 and the flow velocity which is detected by the downstream detector 5, and the converter 6 calculates the flow velocity difference $(v_1-v_0)$ based on the detected velocities. For the reason, in the formula 10, an unknown value is only the number density n of the gas bubble.

Figure 26:
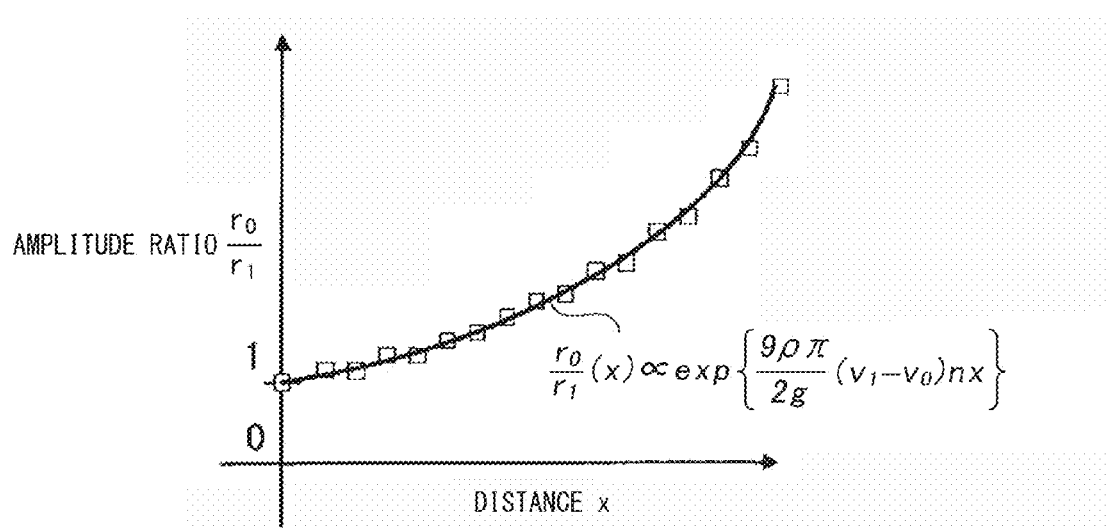
FIG. 26 is a drawing illustrating an example of fitting the formula 10 to the plots of FIG. 25.

FIG. 26 is a drawing illustrating an example of fitting the formula 10 to the plots of FIG. 24. As shown in FIG. 26, the converter 6 calculates the number density n of the gas bubble by fitting the formula 10 (first approximated curve) to the plots of FIG. 25 (the calculated amplitude ratios) while changing the unknown value n. For example, the converter 6 performs the fitting by using a method of least squares, but not limited thereto.

The number density n of the gas bubble indicates a number of the gas bubbles per unit volume. Therefore, at the step S5 in FIG. 23, the converter 6 can calculate a number of the gas bubbles of arbitrary volume based on the number density n of the gas bubble. Also, the converter 6 can determine whether the gas bubble exists in the fluid or not in accordance with the number density n of the gas bubble.

When the number density n of the gas bubble is determined, an unknown value in the formula 8 is only the cross-sectional area $A_0$ (first cross-sectional area) of the gas bubble, and an unknown value in the formula 9 is only the cross-sectional area $A_1$ (second cross-sectional area) of the gas bubble. For the reason, the converter 6 calculates the cross-sectional area $A_0$ by fitting the formula 8 (second approximated curve) to the plots of FIG. 24A (the first amplitudes detected by the upstream detector 4) while changing the unknown value $A_0$. Also, the converter 6 calculates the cross-sectional area A by fitting the formula 9 (third approximated curve) to the plots of FIG. 24B (the second amplitudes detected by the downstream detector 5) while changing the unknown value $A_1$. For example, the converter 6 performs the fitting by using a method of least squares, but not limited thereto.

A diameter $d_0$ (first diameter) of the gas bubble 3a equals to twice a square root of $(A_0/\pi)$, and a diameter $d_1$ (second diameter) equals to twice a square root of $(A_1/\pi)$. Therefore, at the step S6 in FIG. 23, the converter 6 can calculate the diameter do by doubling the square root of $(A_0/\pi)$, and the converter 6 can calculate the diameter $d_1$ by doubling the square root of $(A_1/\pi)$.

When the number density n of the gas bubble and the cross-sectional areas $A_0$ and A are determined, the converter 6 can calculate a void ratio of the upstream detector 4 and a void ratio of the downstream detector 5 based on the following formula 11.

[Formula 11]

$$\text{void ratio} = \frac{3}{4}\pi n \left(\frac{A}{\pi}\right)^{\frac{3}{2}} \quad (11)$$

The void ratio corresponds to a quantity of the gas bubbles. Therefore, at the step S7 in FIG. 23, the converter 6 can calculate a first quantity of the gas bubbles based on the number density n of the gas bubble and the cross-sectional area $A_0$. Same as this, the converter 6 can calculate a second quantity of the gas bubbles based on the number density n of the gas bubble and the cross-sectional area $A_1$.

Figure 27A:
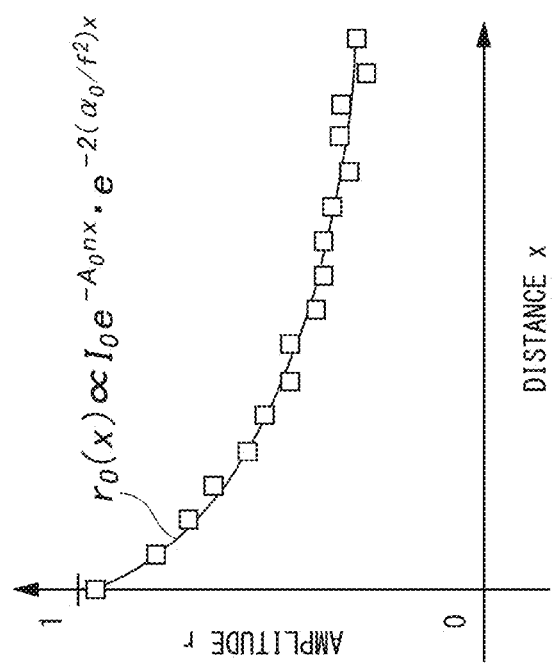
FIG. 27A is a drawing illustrating an example of fitting the formula 8 to the plots of FIG. 24A.
Figure 27B:
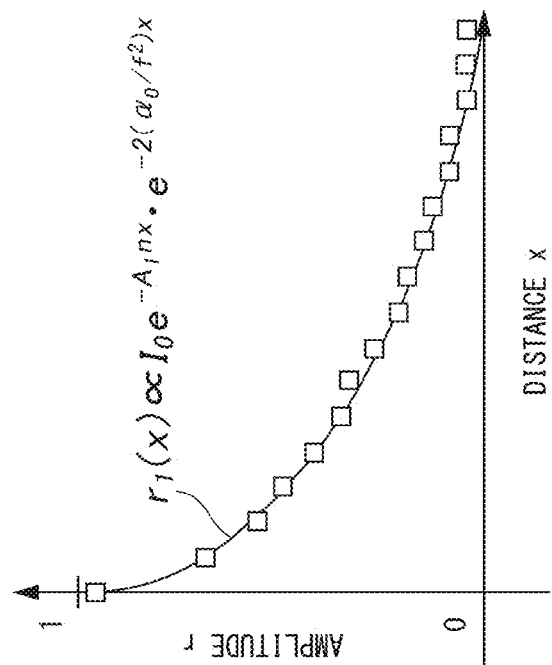
FIG. 27B is a drawing illustrating an example of fitting the formula 9 to the plots of FIG. 24B.

FIG. 27A is a drawing illustrating an example of fitting the formula 8 to the plots of FIG. 24A. FIG. 27B is a drawing illustrating an example of fitting the formula 9 to the plots of FIG. 24B.

As described above, the multiphase flowmeter 10 can output the number density of the gas bubble, the diameter of the gas bubbles, and the quantity of the gas bubbles by the method described above.

Such configuration makes it possible for the multiphase flowmeter 10 to measure the number density of the gas bubble, the diameter of the gas bubbles, and the quantity of the gas bubbles as well as the flow quantity of the fluid simultaneously.

The multiphase flowmeter 10 of the present embodiment can be implemented by the simple configuration similar to existing ultrasonic flowmeter. Such configuration makes it possible for the multiphase flowmeter 10 to calculate the flow quantity of the gas bubbles and have economic advantages.

Because the multiphase flowmeter 10 of the present embodiment can calculate the flow velocity by using the reflection correlation method and the Doppler method, the multiphase flowmeter 10 can measure the fluid of which attenuation of the ultrasonic wave is strong.

Because the multiphase flowmeter 10 of the present embodiment can measure by using the vertical pipe line 1, a horizontal pipe line just for measuring is not necessary. Because the pipe line can be positioned more freely, the entire pipe line can be laid efficiently and compactly.

In the present embodiment, the sequential process of processing the measured signals is a fitting process using a comparative value of the reflection signal. Because the multiphase flowmeter 10 can calculate the quantity of the gas bubbles by using parameters which is necessary for conventional ultrasonic wave flow measurement, another parameter is not necessary. For the reason, the number of the parameters can be minimized.

Fourth Embodiment

Figure 28:
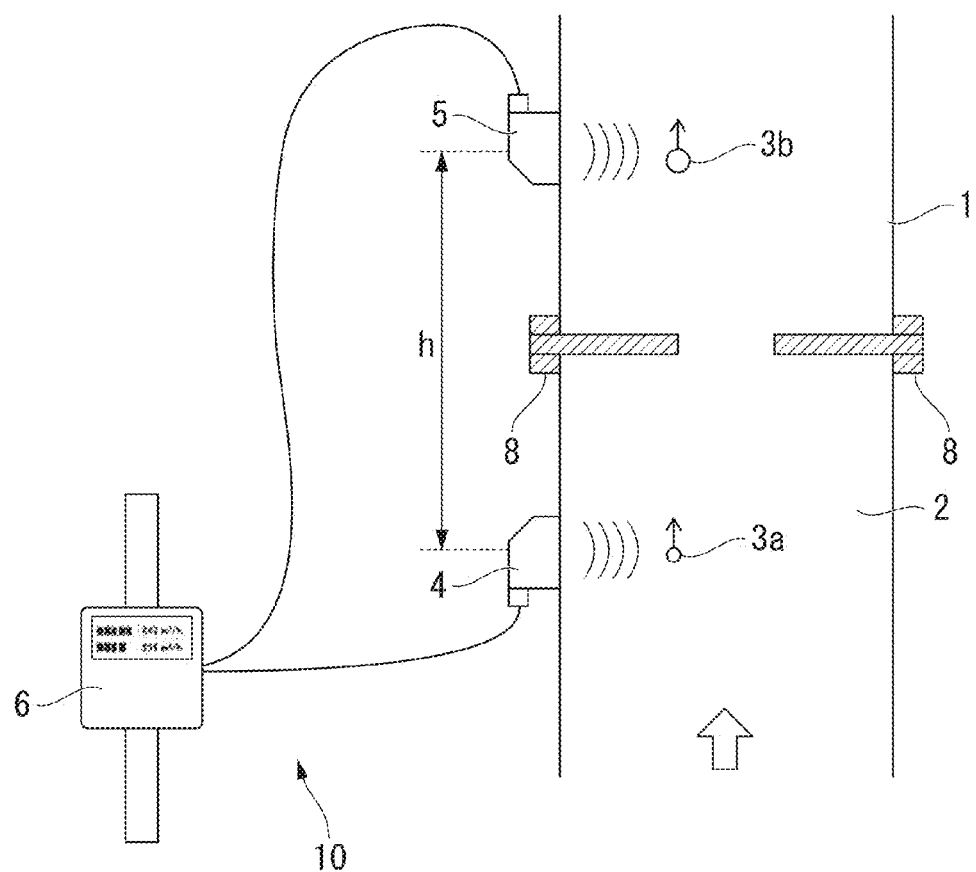
FIG. 28 is a drawing illustrating a multiphase flowmeter in a fourth embodiment.

FIG. 28 is a drawing illustrating a multiphase flowmeter in a fourth embodiment. In this drawing, parts that correspond to those in FIG. 22 are assigned the same reference numerals, and the descriptions thereof will be omitted. In FIG. 28, an orifice 8 is disposed between the upstream detector 4 and the downstream detector 5 of the vertical pipe line 1. The orifice 8 makes a diameter of the vertical pipe line 1 be smaller.

Pressure drop is caused downstream of the orifice 8 generally. In the fourth embodiment, in accordance with the pressure drop, the multiphase flowmeter 10 measures the quantity of the gas bubbles and so on based on the signals which are detected by the upstream detector 4 and the downstream detector 5.

Although a specific measurement method of the fourth embodiment (FIG. 28) is the same as the measurement method of the third embodiment (FIG. 22), even if the height h of FIG. 28 is shorter than the height h of FIG. 22, the pressure drop in the vertical pipe line 1 makes it possible for the multiphase flowmeter 10 to measure the quantity of the gas bubbles and so on accurately.

Because the fourth embodiment is adaptable in a case where the pressure drop is caused in the vertical pipe line 1, for example, differential pressure between upstream and downstream of a Coriolis flowmeter may be used.

In the third embodiment (FIG. 22) and the fourth embodiment (FIG. 23), only the gas bubbles 3a and 3b exist in the fluid 2. However, for example, in a case where only solid particles exist in liquid, the multiphase flowmeter 10 can measure each of them and output measurement signals of them separately.

Figure 29:
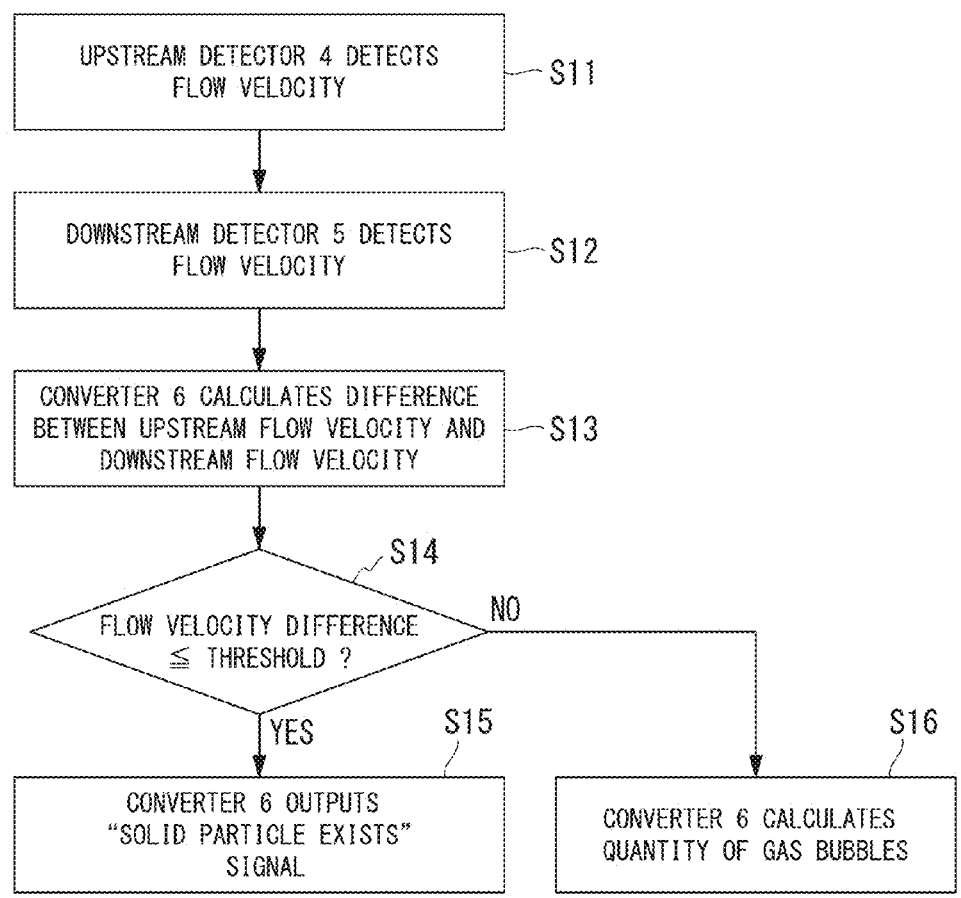
FIG. 29 is a flowchart illustrating processes for determining whether the gas bubble or the solid particle.

FIG. 29 is a flowchart illustrating processes for determining whether the gas bubble or the solid particle. First, the upstream detector 4 detects the flow velocity (step S11). Next, the downstream detector 5 detects the flow velocity (step S12). The converter 6 calculates a flow velocity difference between the flow velocity which is detected by the upstream detector 4 and the flow velocity which is detected by the downstream detector 5 (step S13).

After that, the converter 6 compares the flow velocity difference and a predetermined threshold (step S4). In a case where the flow velocity difference is less than or equal to the threshold (step S14: YES), the converter 6 outputs a signal which represents "solid particle exists" (step S15). In a case where the flow velocity difference is more than the threshold (step S14: NO), the converter 6 calculates the quantity of the gas bubbles (step S16).

Although FIG. 29 is same as FIG. 23 basically, the converter 6 performs a determination process (step S14) with respect to the ultrasonic wave reflector included in the fluid after the converter 6 calculates the flow velocity difference between the flow velocity which is detected by the upstream detector 4 and the flow velocity which is detected by the downstream detector 5.

Because the solid particle is not expanded and contracted by the differential pressure, the flow velocity difference between the upstream side and the downstream side of the vertical pipe line 1 is 0 [m/s] ideally. In the present embodiment, in a case where the flow velocity difference between the upstream side and the downstream side is less than or equal to the threshold, the converter 6 determines that the reflector is a solid particle. In a case where the flow velocity difference is more than the threshold, the converter 6 determines that the flow velocity difference is caused by the buoyancy force, and the converter 6 calculates the quantity of the gas bubbles.

Although the converter 6 determines that a solid particle exists in the fluid, the converter 6 cannot calculate quantity of the solid particle because a size of a diameter of the solid particle is unknown. However, the converter 6 can display a message, which represents that a solid particle exists in the fluid, on a display.

In these embodiments, the multiphase flowmeter 1 has a function of measuring a flow quantity of liquid by using the ultrasonic wave. Also, the multiphase flowmeter 1 has a function of calculating the flow velocity based on the reflection signal which is transmitted by the upstream detector 4 and the reflection signal which is transmitted by the downstream detector 5. Further, by using the differential pressure (for example, differential head, differential pressure between upstream and downstream of the orifice, differential pressure between upstream and downstream of the Coriolis flowmeter, and differential pressure of a narrow pipe) in the vertical pipe line 1, the multiphase flowmeter 1 has a function of calculating the number of the gas bubbles which exists in the fluid based on the intensity of the reflection signal and position information.

Also, the multiphase flowmeter 1 has a function of detecting an effect caused by the buoyancy force of the gas bubble, and the multiphase flowmeter 1 has a function of calculating the diameter of the gas bubble and the quantity of the gas bubbles.

Further, the multiphase flowmeter 1 has a function of determining whether an object included in the fluid is a gas bubble or a solid particle in accordance with the flow velocity difference of the ultrasonic wave reflectors caused by the differential pressure in the vertical pipe 1.

The multiphase flowmeter 1 of the present invention may have at least one of the functions described above.

In the embodiments described above, the multiphase flowmeter 1 can measure the flow quantity of liquid, gas, and solid particles which are mixed in the multiphase fluid easily at low cost.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A multiphase flowmeter comprising:
   a first flow quantity measurer configured to transmit and receive a first measurement signal, the first flow quantity measurer being disposed on an outside wall of a vertical pipe line within which fluid flows;
   a second flow quantity measurer configured to transmit and receive a second measurement signal, the second flow quantity measurer being disposed on an outside wall of a horizontal pipe line which is connected to the vertical pipeline; and
   a flow quantity parameter calculator configured to receive the first measurement signal from the first flow quantity measurer and the second measurement signal from the second flow quantity measurer, the flow quantity parameter calculator being configured to calculate a diameter of gas bubbles in the fluid and a number of the gas bubbles in the fluid in accordance with the first measurement signal and the second measurement signal, the flow quantity parameter calculator being configured to calculate a quantity of the gas bubbles in accordance with the diameter of the gas bubbles and the number of the gas bubbles.

2. The multiphase flowmeter according to claim 1, wherein
   the flow quantity parameter calculator is configured to determine whether or not a gas bubble exists and whether or not a solid particle exists in accordance with the first measurement signal and the second measurement signal.

3. The multiphase flowmeter according to claim 2, wherein
the flow quantity parameter calculator is configured to calculate a diameter of the solid particle and a number of the solid particle.

4. The multiphase flowmeter according to claim 1, wherein
the first measurement signal received from the first flow quantity measurer and the second measurement signal received from the second flow quantity measurer are ultrasonic wave signals.

5. A multiphase flowmeter comprising:
a plurality of detectors configured to detect gas bubbles which are included in fluid, the plurality of the detectors being disposed on an outside wall of a pipe line in which the fluid flows, the plurality of detectors being disposed along a flow direction of the fluid; and
a calculator configured to determine whether the gas bubble exists in the fluid or not in accordance with the detection result of the plurality of the detectors, the calculator being configured to calculate a number density of the gas bubbles, a diameter of the gas bubbles, and a quantity of the gas bubbles in accordance with the detection result of the plurality of the detectors.

6. The multiphase flowmeter according to claim 5, wherein
the calculator further calculates the diameter of the gas bubble and a number of the gas bubbles.

7. The multiphase flowmeter according to claim 5, wherein
the calculator further calculates a diameter of a solid particle and a number of solid particles, the solid particles being included in the fluid.

8. The multiphase flowmeter according to claim 5, wherein
the plurality of detectors comprises a first detector and a second detector which is disposed downstream of the first detector in the flow direction,
the first detector transmits a first detection signal to the fluid,
the second detector transmits a second detection signal to the fluid, and
the first detection signal which is transmitted by the first detector and the second detection signal which is transmitted by the second detector are ultrasonic wave signals.

9. The multiphase flowmeter according to claim 5, wherein
the pipe line comprises a vertical pipe line and a horizontal pipe line which are adjacent to each other, and
the detectors are disposed on an outside wall of the vertical pipe line.

10. A multiphase flowmeter comprising:
a first detector configured to transmit a first ultrasonic wave to fluid which flows in a vertical pipe line, the first detector receiving a first reflection signal which is the first ultrasonic wave reflected by a gas bubble included in the fluid;
a second detector that is disposed downstream of the first detector in a flow direction of the fluid, the second detector transmitting a second ultrasonic wave to the fluid, the second detector receiving a second reflection signal which is the second ultrasonic wave reflected by the gas bubble; and
a calculator configured to receive the first reflection signal from the first detector, the calculator receiving the second reflection signal from the second detector, the calculator determining whether a gas bubble exists in the fluid or not in accordance with the first reflection signal and the second reflection signal, wherein
the calculator is configured to calculate an amplitude ratio of a first amplitude to a second amplitude,
the first amplitude indicates an amplitude of the first reflection signal,
the second amplitude indicates an amplitude of the second reflection signal, and
the calculator is configured to calculate a number density of the gas bubbles by fitting a first approximated curve to amplitude ratios which are calculated by the calculator.

11. The multiphase flowmeter according to claim 10, wherein
the calculator is configured to perform the fitting by using a method of least squares.

12. The multiphase flowmeter according to claim 10, wherein
the calculator is configured to calculate a first cross-sectional area of the gas bubble by fitting a second approximated curve to the first amplitudes, and
the calculator is configured to calculate a second cross-sectional area of the gas bubble by fitting a third approximated curve to the second amplitudes.

13. The multiphase flowmeter according to claim 12, wherein
the calculator is configured to perform the fitting by using a method of least squares.

14. The multiphase flowmeter according to claim 12, wherein
the calculator is configured to calculate a first diameter of the gas bubble based on the first cross-sectional area which is calculated by the calculator, and
the calculator is configured to calculate a second diameter of the gas bubble based on the second cross-sectional area which is calculated by the calculator.

15. The multiphase flowmeter according to claim 12, wherein
the calculator is configured to calculate a first quantity of the gas bubbles based on the number density and the first cross-sectional area which are calculated by the calculator, and
the calculator is configured to calculate a second quantity of the gas bubbles based on the number density and the second cross-sectional area which are calculated by the calculator.

16. The multiphase flowmeter according to claim 10, wherein
the calculator is configured to calculate a number of the gas bubbles based on the number density.

17. The multiphase flowmeter according to claim 10, further comprising:
an orifice configured to make a diameter of the vertical pipe line be smaller, the orifice being disposed between the first detector and the second detector.

* * * * *